United States Patent
Ul Karimi et al.

(10) Patent No.: US 11,232,122 B2
(45) Date of Patent: Jan. 25, 2022

(54) METHOD FOR DATA RETRIEVAL AND DISPERSEMENT USING AN ELIGIBILITY ENGINE

(71) Applicant: Al-Elm Information Security Co., Riyadh (SA)

(72) Inventors: Syed Ejaz Ul Karimi, Riyadh (SA); Ahmed Abdeen, Riyadh (SA); Abdulla Salem Bawazir, Riyadh (SA); Chady Antoun, Riyadh (SA)

(73) Assignee: Al-Elm Information Security Co., Riyadh (SA)

( * ) Notice: Subject to any disclaimer, the term of this patent is extended or adjusted under 35 U.S.C. 154(b) by 305 days.

(21) Appl. No.: 16/451,117

(22) Filed: Jun. 25, 2019

(65) Prior Publication Data
US 2019/0310992 A1 Oct. 10, 2019

Related U.S. Application Data

(63) Continuation of application No. 15/206,969, filed on Jul. 11, 2016, now Pat. No. 10,409,834.

(51) Int. Cl.
*G06F 16/25* (2019.01)
*G06F 16/215* (2019.01)
(Continued)

(52) U.S. Cl.
CPC .......... *G06F 16/254* (2019.01); *G06F 16/215* (2019.01); *G06F 21/64* (2013.01); *G06Q 10/103* (2013.01); *G06Q 50/26* (2013.01)

(58) Field of Classification Search
CPC ......... G06F 17/30563; G06F 17/30303; G06F 16/254; G06F 16/215; G06F 21/64; G06Q 10/103; G06Q 50/26
See application file for complete search history.

(56) References Cited

U.S. PATENT DOCUMENTS 8,374,986 B2   2/2013   Indeck et al.
2001/0044795 A1   11/2001   Cohen
(Continued)

FOREIGN PATENT DOCUMENTS

WO   WO 2012/158488 A1   11/2012

OTHER PUBLICATIONS

"Sun Master Data Management Suite Primer", Oracle, https://docs.oracle.com/cd/E19509-01/820-5699/capssmidxbrdext_intro/index.html, 2010, 26 pages.

*Primary Examiner* — Ken Hoang
(74) *Attorney, Agent, or Firm* — Oblon, McClelland, Maier & Neustadt, L.L.P.

(57) ABSTRACT

A multi-dynamic data retrieval and data disbursement method that is carried out with circuitry such as a computer platform that includes a configurable platform with an eligibility engine having a rules-based processing engine for bulk and parallel processing of an extract-transform-load (ETL) data load flow, a workflow engine, and a prioritization engine, and is connected to internal and external data sources via the configurable platform. The method includes authenticating data according to authenticity parameters and generating an assessment of the data based on processing rules to identify task programs and measure ETL data load flow against a predetermined performance threshold. A plurality of granularity levels of data via ETL processing corresponding to the processing rules is generated in response to the rules-based processing engine then a data disbursement of results is output.

8 Claims, 18 Drawing Sheets

(51) Int. Cl.
    *G06F 21/64*     (2013.01)
    *G06Q 50/26*     (2012.01)
    *G06Q 10/10*     (2012.01)

(56) References Cited

U.S. PATENT DOCUMENTS

| | | |
|---|---|---|
| 2003/0037034 A1 | 2/2003 | Daniels |
| 2004/0034848 A1 | 2/2004 | Moore et al. |
| 2005/0055357 A1 | 3/2005 | Campbell |
| 2006/0294151 A1 | 12/2006 | Wong et al. |
| 2007/0083917 A1 | 4/2007 | Peterson |
| 2008/0189350 A1 | 8/2008 | Vasa |
| 2008/0222634 A1 | 9/2008 | Rustagi |
| 2010/0088133 A1 | 4/2010 | Cina et al. |
| 2013/0006931 A1 | 1/2013 | Nelke |
| 2013/0073515 A1 | 3/2013 | Bhide |
| 2014/0100865 A1 | 4/2014 | Beaton et al. |
| 2015/0142949 A1 | 5/2015 | Nair |
| 2016/0357775 A1 | 12/2016 | Faruquie |

| Enterprise services - 110 | Data integration platform - 120 |
|---|---|
| • Business wizards<br>• Operational console<br>• Technical configurations | • Data agencies<br>• Integration channels<br>• Integration mode |
| Eligibility engine - 130 | Portal - 140 |
| • Rules-driven engine<br>• CM/Workflow engine<br>• Prioritization engine | • Beneficiary portal<br>• CRM portal |

METHOD FOR DATA RETRIEVAL AND DISPERSEMENT USING AN ELIGIBILITY ENGINE

CROSS-REFERENCE TO RELATED APPLICATIONS

The present application is a Continuation of Ser. No. 15/206,969, now allowed, having a filing date of Jul. 11, 2016.

BACKGROUND

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present disclosure.

Managing and operating social service programs are a challenging problem in which multiple entities and protocols must be balanced. Presently, multiple systems may be implemented to solve the problem of managing multiple social service programs. The operation and maintenance of multiple systems, however, negatively impacts the costs of the implementation and the efficiency of the managing capabilities of the systems. For example, the operation and maintenance of multiple systems can yield an inefficient utilization of computing resources, suboptimal prioritization of workloads, unnecessary system overhead, as well as other undesirable traits of row level data processing, i.e. data processing row-by-row.

SUMMARY

In an exemplary aspect, a device includes circuitry configured to provide a configurable platform including a rules-based processing engine configured to perform bulk and parallel processing of an extract-transform-load (ETL) data load flow, access and manipulate in response to a request from a remote device a plurality of configurable databases, retrieve first data from one of the configurable databases, register the first data for one or more task programs of the configurable platform, and authenticate the first data according to one or more authenticity parameters. The circuitry is also configured to process the first data against processing rules of the rules-based processing engine to generate an assessment of the first data based on the processing rules, and identify and configure each task program when the assessment of the first data satisfies predetermined criteria according to the processing rules. The circuitry is further configured to measure the ETL data load flow against a predetermined performance threshold, route the ETL data load flow to a database processing engine when the rules-based processing engine does not satisfy the predetermined performance threshold, and output to the remote device a data disbursement of results associated with the task program when the first data is authenticated and the predetermined performance threshold has been satisfied by the rules-based processing engine.

The system for managing and operating social service programs provides a rules-based processing engine that is capable of bulk and parallel processing. The implementation of bulk and parallel processing eliminates limiting factors of conventional transactional processing of rules-based processing engines. As such, the bulk and parallel processing enables the social service program to operate efficiently and accurately to evaluate data according to dynamically changing processing rules, without the need for constant system maintenance and/or high operation costs.

A combination of technical and operational activities is implemented through a single platform by accessing and manipulating a plurality of configurable databases. In one aspect of the disclosure, one or more databases may be associated/integrated within the platform. Such databases include, for example, a first database having core data, such as ETL data, for the platform that is accessed and manipulated by technical and operations users. A second integrated database may be a portal database, which contains applicant profile data. A third integrated database may be an archive database, which contains archived platform data. A social services platform combines enterprise services, a data integration platform, an eligibility engine, and a portal.

The data integration platform connects external and internal data sources to an eligibility engine. The eligibility engine includes a rules-driven engine, a case management/workflow engine, and a prioritization engine. The combined bulk and parallel processing capabilities provide a hybrid implementation of extract, transform, and load processing and database engine processing. This eliminates row level data processing to provide an enhanced efficiency of large data loads.

In one aspect of the disclosure, inefficiencies of row level processing can be eliminated at multiple stages using embodiments described herein. This results in a more cost efficient data processing technique requiring less computational bandwidth. During the data preparation phase, bulk data is moved through ETL processing in multiple stages, such as data quality and consolidation stages. In one aspect of the disclosure, the ETL process may utilize case statements which perform the validations and consolidations on bulk data. The eligibility engine has stages in which the data is processed in bulk before exposing it to business rules.

Several advantages are derived from the processing described herein. The performance and efficiency are improved because the application is not compromised due to large data loads. As the data is prepared, the response time of the application is faster. In addition, data quality ensures that validation of the data is performed during data processing. Also, the consolidation processing assists in preparing structured and meaningful data, where some of the rules are applied in a bulk manner on applicant data. For example, if the financial income of a family from multiple sources needs to be consolidated, the application can be configured to execute this activity on all data as the data is being uploaded. Consolidation begins with an individual (or a member/subscriber/entity) and subsequently proceeds with all family members (or associated members/subscribers/entities) to provide an overall income for the entire family. Eligibility rules are applied on the resulting value and information that was obtained.

The data integration platform supports integrating data agencies using a batch mode or an online mode. The batch mode enables the consolidation of access to a plurality of configurable database from a single secure location. Instead of accessing the different configurable databases at separate secure locations for each associated end-user service requested, the batch mode enables a configuration in which information related to a user is authenticated and task programs associated with the information are retrieved from the plurality of configurable databases. In this manner, any applicable end-user service associated with the authenticated information may be retrieved and activated for efficient processing. The portal of the social services platform provides a customized detailed registration of data that is specific to a particular social service program.

The social services platform implements the technical and operational activities in real time. When a change at a data source is made, the change can be easily reconfigured through the portal. If there is a new data source that needs to be added, it can also be easily configured through the portal by storing the new data source in a configuration repository to be processed by the configuration process dynamically. As a result, the executables for extract, transform, and load data processing and database transformation are created. Such a change can be applicable to the rule-based engine to reconfigure attributes for data retrieval. In doing so, a different array of data and databases can be searched based on the configurable rules. In one aspect, such implementation can increase data search and retrieval times as well as outputting a more thorough and accurate count of eligible end-user services. In another aspect, the configurable rules can enhance data retrieval timing and performance by targeting specific end-user services associated with specific user data attributes.

The enterprise services and the portal of the social services platform are provided by clustering application servers according to a high availability and redundancy load balancing model, which are part of the initial clustering with horizontal scalability to add servers dynamically at any time. Online transaction processing database services can be provided by a failover clustering to database servers. Extract, transform, and load processing can be distributed across a load balance model of two hosts, for example. While server clustering remains a failsafe measure to ensure redundancy and data security, the implementation of a configurable rules-based engine further enables efficient processing of data and retrieval of data that can help reduce server clustering.

The social service platform advancements described herein provide for the creation of an improved all-inclusive platform to provide faster processing of data and enabling faster and more comprehensive data retrieval. Therefore, the advancements described herein improve existing technological processes in a variety of technical arenas such as data management, data retrieval and information processing. Bulk processing of data improves and expedites the processing and retrieving of data. Data bulk processing executes a series of tasks simultaneously at one time. Rather than processing and retrieving data one by one, embodiments described herein process the bulk of the data at one point. In addition, the eligibility assessment rules are applied to a group of applicants, rather than individually to each applicant. Therefore, described herein is a specific implementation of a solution to an existing problem. As a result, the systems and methods described herein are directed to a novel implementation implemented via special purpose computing rather than mere generic features implemented on a general-purpose computer.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is a schematic of a system architecture according to an embodiment;

DETAILED DESCRIPTION

Figure 2:
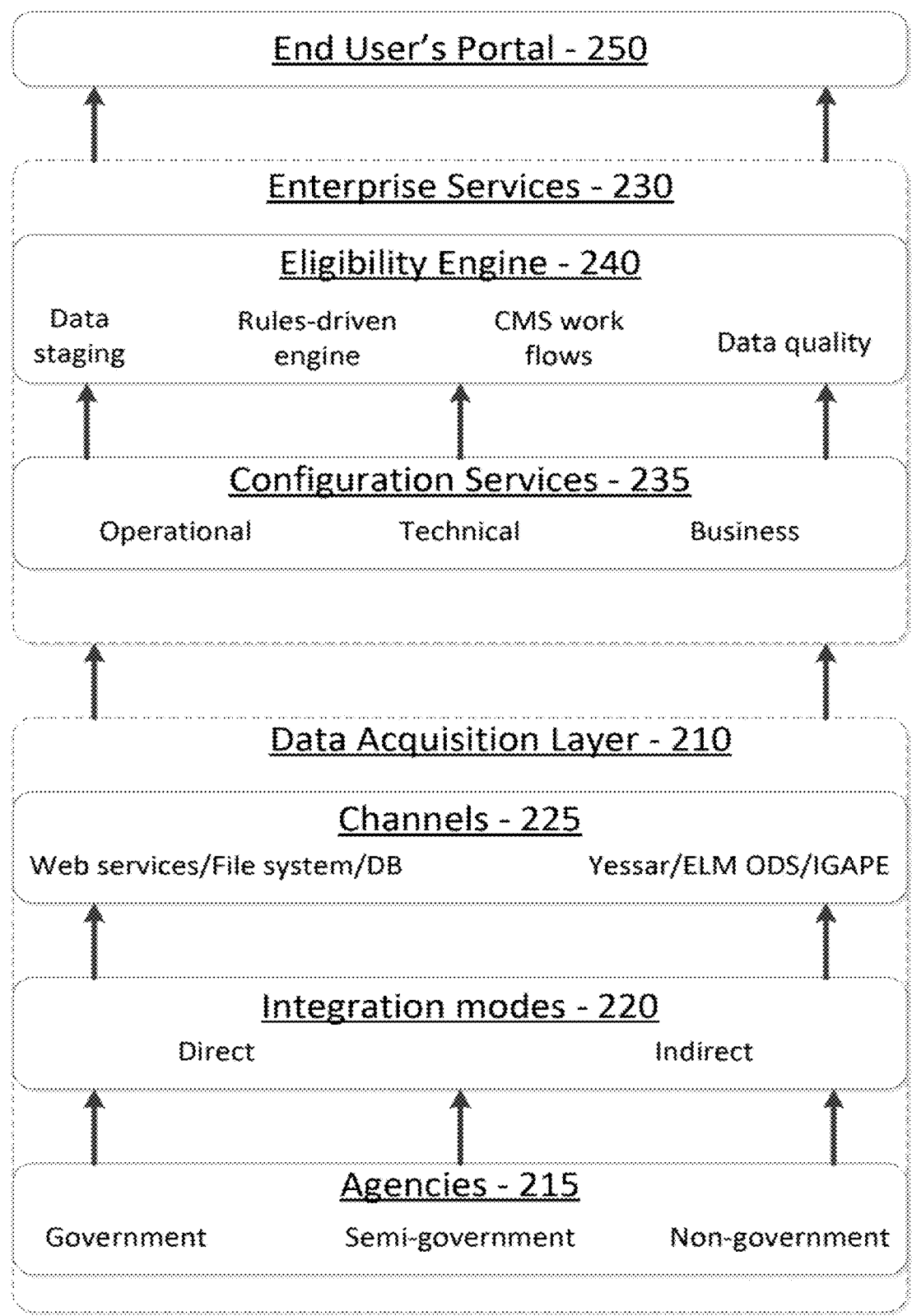
FIG. 2 illustrates an enterprise services component according to an embodiment.

In the drawings, like reference numerals designate identical or corresponding parts throughout the several views. Further, as used herein, the words "a," "an" and the like generally carry a meaning of "one or more," unless stated otherwise.

FIG. 1 is a schematic of a system architecture 100 for managing and operating social service programs, according to certain exemplary aspects. The system architecture 100 is a social services platform (SSP) designed to automate business, technical, and operational activities of a social services program. The system architecture 100 can be configured to implement a single information technology platform for performing social services through the access and manipulation of configurable databases. As such, the system architecture 100 can be utilized to grant benefits to applicants based on multiple internal/external entities and business processes. Sizing of the system architecture 100 is based on business requirements. The volume of data drives the amount of SAN storage required. The volume also drives the processing power required.

System architecture 100 includes an enterprise services system 110. Enterprise services system 110 can be grouped into three different functions. A business service function allows business users to configure parameters at the program level. It also includes the services to configure agencies and data sources needed for the program. A technical service function enables technical users to configure technology components of the system, such as data flow tasks, data quality, and eligibility rules. An operational services function allows operational users to configure operational needs, such as host configuration, data source connectivity, system, users, and system processes.

Enterprise services system 110 includes business wizards such as a social services program wizard, an extensive data source library, one or more data source wizards, and business reports and dashboards. Enterprise services system 110 also includes an operational console having a user manager, a host and data source configuration, and process configuration, execution, and monitoring. Enterprise services system 110 also includes technical configurations, such as a built-in predicates library, eligibility rules and predicate wizards, and a data quality configuration.

System architecture 100 also includes a data integration platform 120. Data integration platform 120 provides a robust framework to connect external or internal data sources to an eligibility engine or a prioritization engine. System architecture 100 can also upload data to external systems, if needed. Some characteristics of data integration platform 120 include fetching data from various organizations. Data integration platform 120 has a direct integration mode which receives and sends data directly from/to a data source, and an indirect mode which receives and sends data to an intermediate hub. Data integration platform 120 supports integrating data agencies using batch or online mode. Data integration platform 120 also supports various channels of integration, such as file systems/secure file transfer protocol (SFTP)/managed file transfer (MET), web service, or database integration.

Data integration platform 120 includes data agencies, such as government, semi-government, and private sectors; multi-domain support, such as employment, social welfare, and housing; and direct and indirect data agencies. Data integration platform 120 also includes integration channels, such as file systems, database integration, and web service integration.

System architecture 100 also includes an eligibility engine 130. Eligibility engine 130 includes several components. A first component is a data staging module, which includes data archival, data quality, and data consolidation processes. A second component is a rules-driven eligibility engine, which applies rules that are configurable using an extensive predicates and parameters library. The library also supports customization in terms of adding new predicates and parameters or modifying existing predicates and parameters. A third component is a case-management eligibility engine, which provides pre-built workflows or configurable workflows based on best practices of a social welfare program. It is relevant to specific eligibility rules that require human intervention. A fourth component is a prioritization engine, which allocates a rank or weight to individuals. This rank or weight determines priority of the applications, such that applications with a higher rank are initiated to faster processing. A fifth component is a platform, which conducts eligibility in a simulation mode.

Eligibility engine 130 includes a rules-driven engine having a user interface-driven configurability and customization, bulk and parallel processing, rule granularity control, and simulation runs. Eligibility engine 130 also includes case management (CM)/workflow engines having workflow management and customization, and multi-domain support for finance, social welfare, and health. Eligibility engine 130 also includes a prioritization engine with configurable rules.

System architecture 100 also includes a portal 140. Portal 140 is a platform's end-user portal, which exposes common functions generally applicable to various kinds of programs. Two of the functions include registration and eligibility inquiry. Portal 140 also provides customized detailed registration specific to a particular social service program. A Customer Relationship Management (CRM) module of portal 140 provides a self-service interface to a beneficiary for filing an appeal against a decision. This module will initiate a workflow, which is assigned to a CRM officer. If necessary, the CRM officer will be able to collaborate with other stakeholders using the case management tools.

Portal 140 includes a beneficiary portal having a user registration and profile manager, a self-assessor, and an application inquiry. Portal 140 also includes a CRM portal having a self-appeal manager, a CRM appeals manager, and a helpdesk and incident manager.

FIG. 2 illustrates a logical component diagram of system architecture 100. In a bottom-up description, a data acquisition layer 210 is illustrated. An agency sub-component 215 includes government agencies, semi-government agencies, and non-government agencies. An integration mode 220 can include a direct mode and an indirect mode. A channel sub-component includes web services, file systems, and databases. Examples include, but are not limited to Yessar, ELM ODS, and IGAPE.

FIG. 2 also illustrates an enterprise services component 230. A configuration services sub-component 235 includes operational configuration services, technical configuration services, and business configuration services. An eligibility engine sub-component 240 includes data staging, a rules-driven engine, CMS work flows, and data quality. An end user's portal 250 is also illustrated in FIG. 2, which includes, but is not limited to J2EE, MS SQL/Oracle.

The system architecture 100 includes processing circuitry configured to provide a data integration platform and business rule engine with bulk and parallel processing capabilities. In certain aspects, the bulk and parallel processing capabilities include a hybrid implementation of extract, transform, and load (ETL) processing and database engine processing.

Row level data processing can be eliminated by using batch data processing at multiple staging layers. During a data preparation phase, bulk data is moved through ETL processing in multiple stages, such as data quality and consolidation stages. Internally, the ETL process has case statements to perform the validations and consolidations on bulk data. The eligibility engine has stages in which the data is processed in bulk before exposing it to established business rules.

Eliminating row level data processing provides advantages as will be further discussed herein. The performance and efficiency of the application is not compromised, due to large data loads. As the data is prepared, the response time of the application is faster. Data quality ensures that validation of data is performed. Consolidation assists in preparing structured and meaningful data.

In one aspect of the disclosure, inefficiencies of row level processing can be eliminated at multiple stages using embodiments described herein. This results in a more cost efficient data processing technique requiring less computational bandwidth. During the data preparation phase, bulk data is moved through ETL processing in multiple stages, such as data quality and consolidation stages. In one aspect of the disclosure, the ETL process may utilize case statements which perform the validations and consolidations on bulk data. The eligibility engine has stages in which the data is processed in bulk before exposing it to business rules.

Several advantages are derived from the processing described herein. The performance and efficiency are improved because the application is not compromised due to large data loads. As the data is prepared, the response time of the application is faster. In addition, data quality ensures that validation of the data is performed during data processing. Also, the consolidation processing assists in preparing structured and meaningful data, where some of the rules are applied in a bulk manner on applicant data. For example, if the financial income of a family from multiple sources needs to be consolidated, the application can be configured to execute this activity on all data as the data is being uploaded. Consolidation begins with an individual (or a member/subscriber/entity) and subsequently proceeds with all family members (or associated members/subscribers/entities) to provide an overall income for the entire family. Eligibility rules are applied on the resulting value and information that was obtained.

Some of the business rules are applied in bulk manner on applicant data. For example, if financial income of a family is consolidated from several sources, the application can be configured so that the activity is implemented on all data that is uploaded. Consolidation begins with the individual followed by all family members to eventually provide an overall income of the entire family. Eligibility rules are applied on the gathered values and information.

The processing circuitry can be configured to register applicant data for one or more social service programs of the configurable data integration platform at a remote device. The applicant data can include a name, a username, a uniquely identifiable tag, a login, a unique sequence of characters used to identify a particular applicant, and the like. The processing circuitry can also be configured to authenticate the applicant data according to one or more authenticity parameters. The authenticity parameters are utilized to verify the user registering for the social service program. The authenticity parameters can include a national identification (ID) of the applicant, a birth date of the applicant, an issuance date of the national ID of the applicant, an expiry date of the national ID of the applicant, a validation of household of the applicant, a password, a predetermined biometric input, a predetermined answer to a predetermined security question, and the like.

The processing circuitry can also be configured to access personal data corresponding to the applicant data when the authenticity parameters are authenticated. In some aspects, the SSP can connect with government and non-government agencies to authentically acquire the personal data. The processing circuitry can further be configured to determine business rules of the business rule engine.

The business rules are applied in a bulk manner to the applicant data to further calculate an eligibility assessment of the applicant data, wherein all data of the applicant is processed against defined business rules at one point, rather than processing against the business rules one by one. A consolidation state in the preparation phase helps to apply the business rules in a bulk manner to applicant data. This consolidation is applied on all of the data during bulk loading using ETL processing, or using the database engine processing capabilities or hybrid processing. For example, if the financial income of a family is consolidated from all sources, the application can be configured such that the activity can be implemented on all of the data that is being uploaded. Consolidation starts with an individual and continues to his/her family members to eventually provide an overall income of the entire family. The type of applied rule depends on the different scenarios or circumstances and is based on the requirement. For example, if the eligibility is derived by age, then age predicates and predicate parameters are used.

The eligibility assessment can be driven by dynamically changing business rules. The business rules are fully configurable via the configurable data integration platform and utilize authentic data accessed at the database. Attributes and values received from one or more authenticated sources, via the integration layer are used to configure business rules. A data integration platform (DIP) provides access to the data through configured predicates and predicate parameters. It also provides the power to modify and configure the predicate parameter thresholds in real time.

The processing circuitry can further be configured to manage the applicant data, when the applicant data satisfies the eligibility assessment, according to the corresponding business rules. As such, the configurable data integration platform manages and executes the entire life cycle of each social service program for each authenticated applicant data. The configurable data integration platform can be utilized to define and configure each social service program according to business rules.

Additionally, the processing circuitry can be configured to manage applicant data according to each enrolled social service program until the disbursement of benefits and/or any end-user services. The processing circuitry can output a disbursement of benefits and/or end-user services, when the applicant data is authenticated and the business rules have been successfully applied via bulk and parallel processing. The bulk and parallel processing enables the social service program to operate efficiently and accurately to evaluate applicant data according to dynamically changing business rules. In some aspects, the processing circuitry can be configured to shift processing when computing resources are in use, so that each job processing time is optimized. In other aspects, the processing circuitry can be configured to avoid the idling of computing resources by incorporating continuous intervention and supervision of the system architecture 100. Additionally, the processing circuitry can prioritize specific workloads and further reduce system overhead by limiting each program to run once for a plurality of similar transactions.

Figure 3:
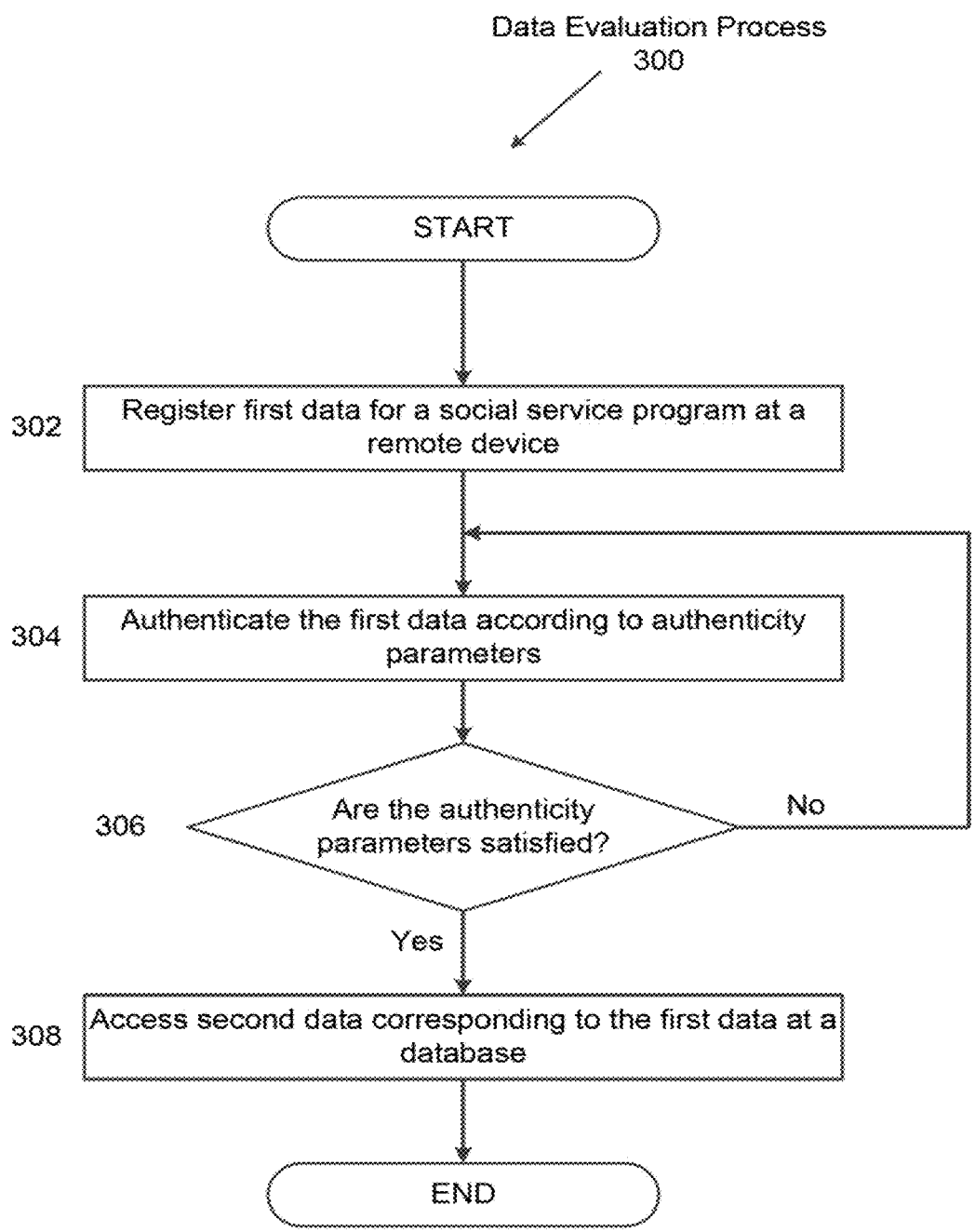
FIG. 3 is an algorithmic flowchart of a data evaluation process, according to an embodiment.

FIG. 3 is an algorithmic flow chart of a data evaluation process 300, according to certain exemplary aspects. The data evaluation process 300 describes a process of authentication and assessment of applicant data to validate the enrollment of the applicant data in a particular social service program. At step 302, applicant data is registered for a social service program. The processing circuitry can be configured to register applicant data for one or more social service programs of the configurable data integration platform. The applicant data can include a name, a username, a uniquely identifiable tag, a login, a unique sequence of characters used to identify a particular user, and the like.

At step 304, the processing circuitry can be configured to authenticate the applicant data according to one or more authenticity parameters. The authenticity parameters are utilized to verify the user registering for the social service program. The authenticity parameters can include a national identification (ID) of the applicant, a birth date of the applicant, an issuance date of the national ID of the applicant, an expiry date of the national ID of the applicant, a validation of household of the applicant, a password, a predetermined biometric input, a predetermined answer to a predetermined security question, and the like. SFTP can be used to transfer files securely. SFTP also supports Secure Shell (SSH) protocol, which uses public key cryptography to create a more secure method to authenticate a client's identity and rights to access a server.

At step 306, a determination is made of whether the applicant data satisfies the authenticity parameters. As such, the applicant data must satisfy each tested authenticity parameter to ultimately be validated on its merits. If the applicant data is determined to satisfy the authenticity parameters via the processing circuitry, resulting in a "yes" at step 306, the data evaluation process 300 proceeds to step 308. Otherwise, if the applicant data is determined to not satisfy the authenticity parameters via the processing circuitry, resulting in a "no" at step 306, the data evaluation process 300 proceeds to step 304.

At step 308, the processing circuitry can be configured to access personal data corresponding to the applicant data. In some aspects, the personal data corresponding to the applicant data is accessed only when every tested authenticity parameter has been satisfied. The configurable data integration platform can connect with government and non-government agencies to authentically acquire the personal data. The personal data can include user specific information corresponding to the applicant data which is utilized to determine business rules corresponding to one or more social service programs.

Figure 4:
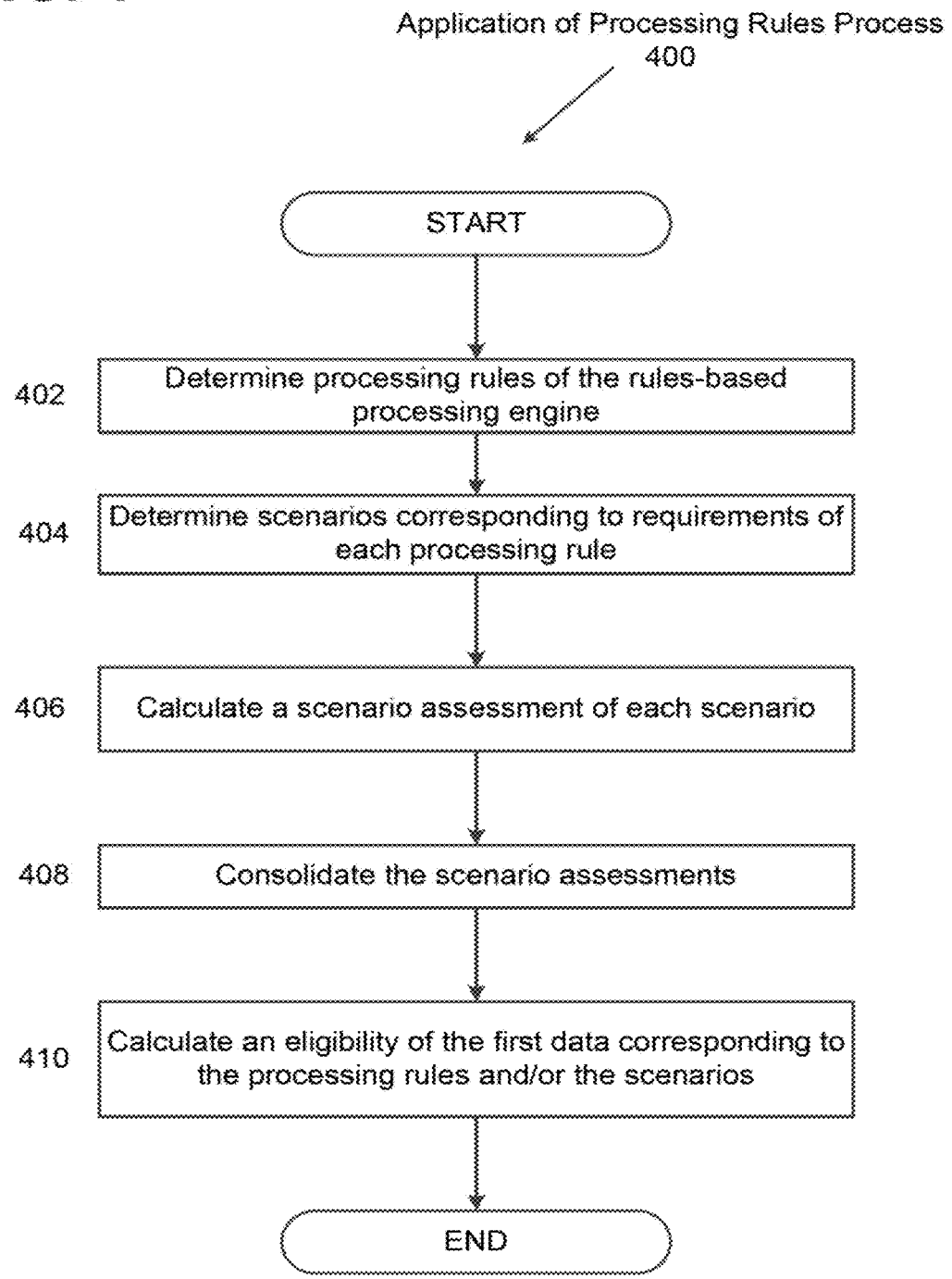
FIG. 4 is an algorithmic flowchart of an application of processing rules process, according to an embodiment.

FIG. 4 is an algorithmic flowchart of an application of processing rules process 400, according to certain exemplary aspects. The application of processing rules process 400 describes a process of determining business rules of a business rule engine, and applying the business rules to applicant data. At step 402, processing circuitry is configured to determine business rules of a business rule engine. The business rules are fully configurable via the configurable data integration platform and utilize authentic data accessed at the database. In certain aspects, the business rules correspond to parameters used to determine services and/or benefits of each social service program. In some aspects, the business rules can be applied in a bulk manner to applicant data to further calculate an eligibility assessment of the applicant data. As such, the eligibility assessment is ultimately driven by the dynamically changing business rules.

In certain cases, some attributes should be added or removed to meet the business requirements. Accordingly, the business rule can be reconfigured to accommodate the rule change. The SSP administrator can modify one or more business rules, based on legislation changes. This does not require any additional development or testing. The configurations are used by the business rules during the processing. Hence, the business rules can be configurable. For example, in processing an eligibility today for an age limit of 25 years, which is changed to 35 years at a later time, then the SSP administrator can modify this attribute in DIP and the changes are picked up by the engine. Similarly, if the application is processing an online request and the SSP administrator modifies an attribute, then the modified data is picked up by the business rules. Hence, the business rules are altered in real time.

At step 404, the circuitry can be configured to determine business scenarios corresponding to business requirements of each business rule. The business requirements impose restrictions on the business rules of each social service program. As such, the business requirements can yield a plurality of business scenarios in which each case of applicant data corresponds to a particular business scenario. The business scenarios correspond to the business requirements, and may be measured against the business rules. Certain measurements can be made to assess the performance of the business rule engine including, but not limited to loading a large amount of data within a specific time, calculating the eligibility result for all applicants in the eligibility process, a predetermined rate such as one million data transactions within two minutes, 3.2 million monthly transactions and no performance issues until the present, and 99.9% availability.

Business requirements can be represented through multiple rules. In addition, a particular rule can have more than one scenario in which to handle a different case for the same rule. For example, finding a family income might be a requirement. Processing income details from multiple data sources, based on a date range can be a rule, whereas processing it based on gender can be a scenario.

At step 406, a scenario assessment is calculated for each business scenario via the processing circuitry. In some aspects, a particular business scenario is calculated for a plurality of applicants in bulk mode. For example, if a plurality of applicant data is determined to be evaluated for a particular social service program, the processing circuitry can be configured to calculate the business scenario for each applicant data of the plurality of applicant data simultaneously.

At step 408, the processing circuitry can be configured to consolidate the scenario assessments. The scenario assessments can be consolidated in bulk mode so that the business rules may further be applied to each applicant data.

At step 410, the processing circuitry can be configured to calculate an eligibility assessment of the applicant data corresponding to the business rules of each applied business scenario. The processing circuitry can further be configured to manage the applicant data, when the applicant data satisfies the eligibility assessment, according to the corresponding business rules. As such, the configurable data integration platform manages and executes the entire life cycle of each social service program for each applicant data.

Figure 5:
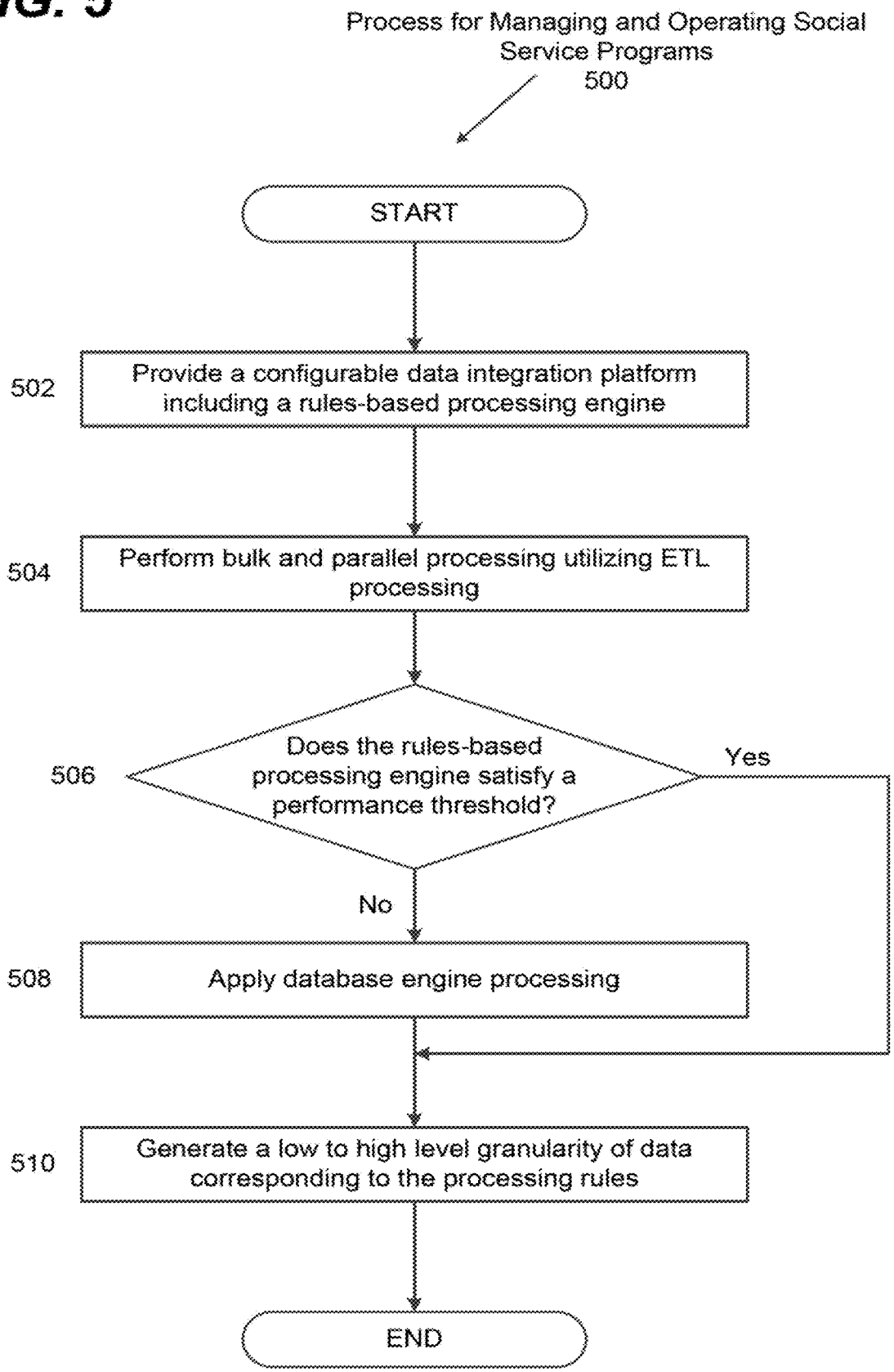
FIG. 5 is an algorithmic flowchart of a process for managing and operating social service programs, according to an embodiment.

FIG. 5 is an algorithmic flowchart of a process for managing and operating social service programs 500, according to certain exemplary aspects. The process for managing and operating social service programs 500 describes a process of implementing a platform for the attribution and facilitation of social service programs to applicant data. At step 502, processing circuitry provides a configurable data integration platform including a business rule engine. Additionally, the configurable data integration platform can include a built in data source library, intelligent predicates, data quality rules, and the like. The configurable data integration platform can be configured to support multi-mode execution with data lineage and data archival features.

Based upon the data coming from the data source, predicates and predicate parameters can be configured using the SSP. The predicates and predicate parameters are used while configuring the business rules. For example, "date of birth" can come from the data source; "age" is a predicate based on the data field; and "age in years" and "age in months" are predicate parameters derived from "date of birth." In configuring a business rule, the application provides use of "age" parameters. For example, it can be used to check the age range to find the eligibility of an applicant.

Other portions of the application are configured such that further processing is carried out, based on the output provided by the eligibility engine, such as "payments" or "prioritization." Business rules for the components are also configured in the rules engine, based on the business requirement. As a result, it is a two-way interaction between the rules engine and other components.

In the event there is a change at the data source agency portion in which the SSP will integrate, it can be easily reconfigured through the SSP portal to handle these changes. Some examples of possible changes include, but are not limited to attributes, integration with a mode type, and integration with a file type. If there are new data sources that need to be added, due to a business requirement, they can be easily configured through the SSP portal by providing information as described herein. The new data sources are stored in a configuration repository and they are processed by the configuration process dynamically, so that the executables for ETL data load, ETL database transformation, etc. are created. This prepares the data subsequent implementation. These activities are implemented by the application, except the initial parameters are provided through the SSP portal.

At step 504, the processing circuitry can be configured to perform bulk and parallel processing utilizing ETL processing. In certain aspects, the bulk and parallel processing capabilities include a hybrid implementation of extract, transform, load (ETL) processing and database engine processing. During hybrid implementation of the SSP, it is determined to use ETL capabilities and data base engine processing capabilities to load data, such that performance of the system is not compromised. Positive effects of hybrid implementation include, but are not limited to increased efficiency of the application during data loading and utilized capabilities of the database engine. A detailed description of hybrid implementation is given herein.

The ETL processing can be performed by the circuitry for Ada Semantic Interface Specification (ASIS) data loads, archive data loads, transformation data loads, consolidation data loads, and the like. As such, the bulk and parallel processing is utilized to bring the data to a state in which the data can be consumed by business rules.

At step 506, a determination is made of whether the business rule engine satisfies a performance threshold in performing ETL processing. The performance threshold can be utilized to determine whether ETL processing can be performed without negatively impacting the performance of the data processing. If the business rule engine does not satisfy the performance threshold, resulting in a "no" at step 506, the process for managing and operating social service programs 500 proceeds to step 508. Otherwise, if the business rule engine does satisfy the performance threshold, resulting in a "yes" at step 508, the process for managing and operating social service programs 500 proceeds to step 510.

At step 508, the processing circuitry can be configured to apply database engine processing to the data. The database engine processing is performed for transformation data loads and/or consolidation data loads when the business rule engine does not satisfy a predetermined performance threshold. As such, when the transformation data loads and/or consolidation data loads are heavy for ETL processing, therefore negatively impacting the processing performance, the data loads are pushed to database engine processing.

At step 510, the processing circuitry can be configured to generate a low to high level granularity of data corresponding to the business rules. In some aspects, the low to high level granularity of data can be utilized to categorize the data according to corresponding business scenarios. In other aspects, the low to high level granularity of data can be utilized to distinguish applicant data within each particular social service program.

The enterprise services 110 and the portal 140 web services of the SSP can be provided by clustering of application servers with identical, or nearly identical hardware and system configuration. A high availability and redundancy load balancing model requires a minimum of two application servers, which are part of the initial clustering with horizontal scalability to add servers dynamically at any time in the future. In an example, given for illustrative purposes only, SSP online transaction processing (OLTP) database services are provided by failover clustering of two database servers (active/passive model) with identical, or nearly identical hardware and system configuration. SSP ETL processing can be distributed across a load balance model of two ETL hosts with identical, or nearly identical hardware and system configuration.

Sizing and capacity requirements of necessary hardware depends heavily on various operation factors of a social service program, such as the number of concurrent users, data throughput, data archival requirements, the number of data sources, the frequency of engine cycles, and the like. An optimal size needs to be derived by assessing and analyzing all operational factors.

Figure 6:
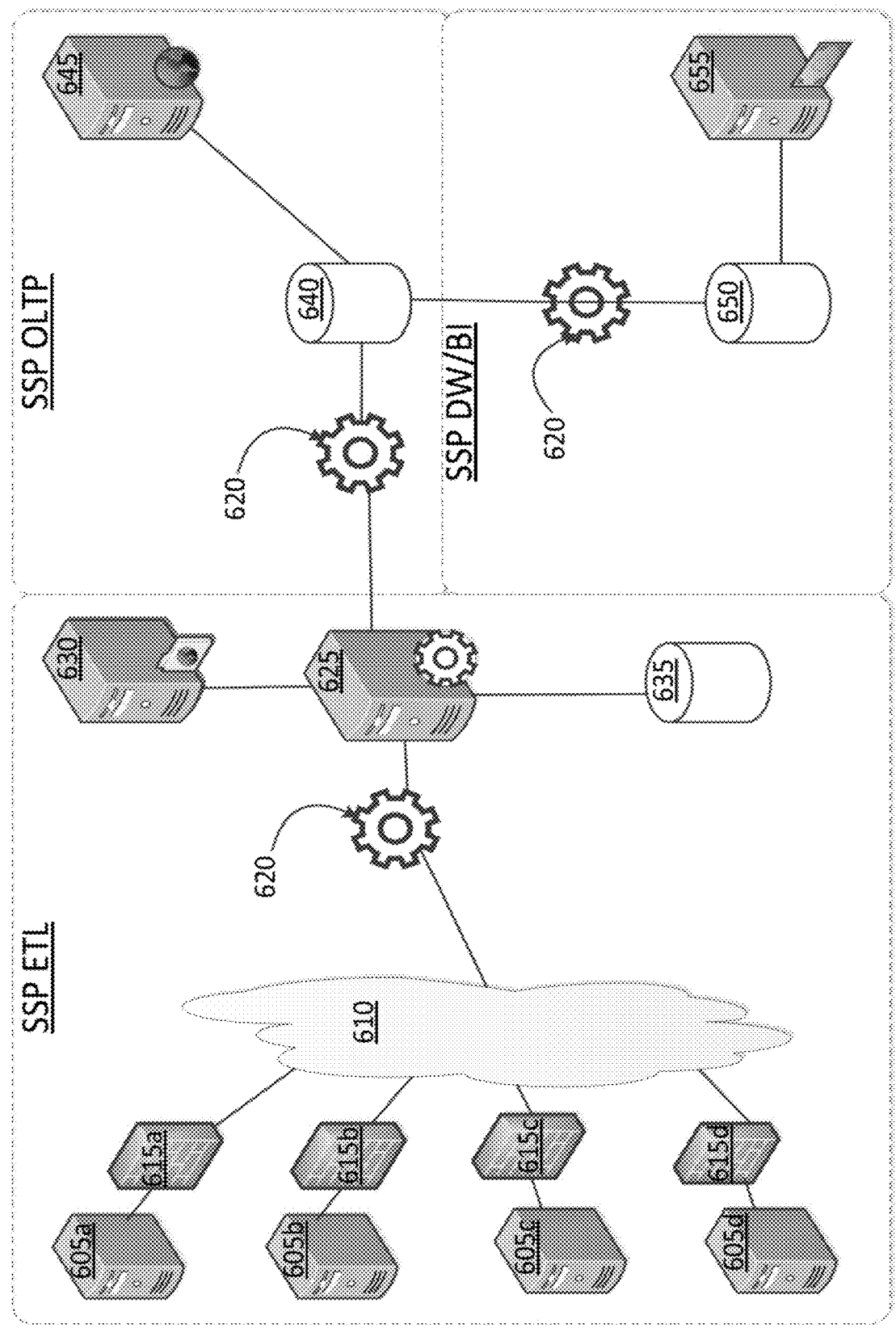
FIG. 6 is a schematic of an exemplary social services platform (SSP) according to an embodiment.

FIG. 6 is a schematic illustration of an overall hardware deployment for an exemplary SSP, such as system architecture 100. A SSP ETL section includes a plurality of agencies 605a-605d connected to an Extranet 610, via associated firewalls 615a-615d. One or more ETL processing engines 620 connect the Extranet 610 to a SSP ETL host 625. The SSP ETL host 625 is connected to a SSP SFTP host 630 and a SSP ETL database 635.

FIG. 6 also illustrates a SSP OLTP section. The SSP OLTP section includes one or more ETL processing engines 620, which interconnect the SSP ETL host 625 to a SSP OLTP database 640. The SSP OLTP database 640 is connected to a SSP web host 645.

FIG. 6 also illustrates a SSP data warehouse (DW)/ business intelligence (BI) section. One or more ETL processing engines 620 interconnect the SSP OLTP database 640 of the SSP OLTP section to a SSP DW database 650 of the SSP DW/BI section. The SSP DW database 650 is connected to a SSP BT host 655.

Figure 7:
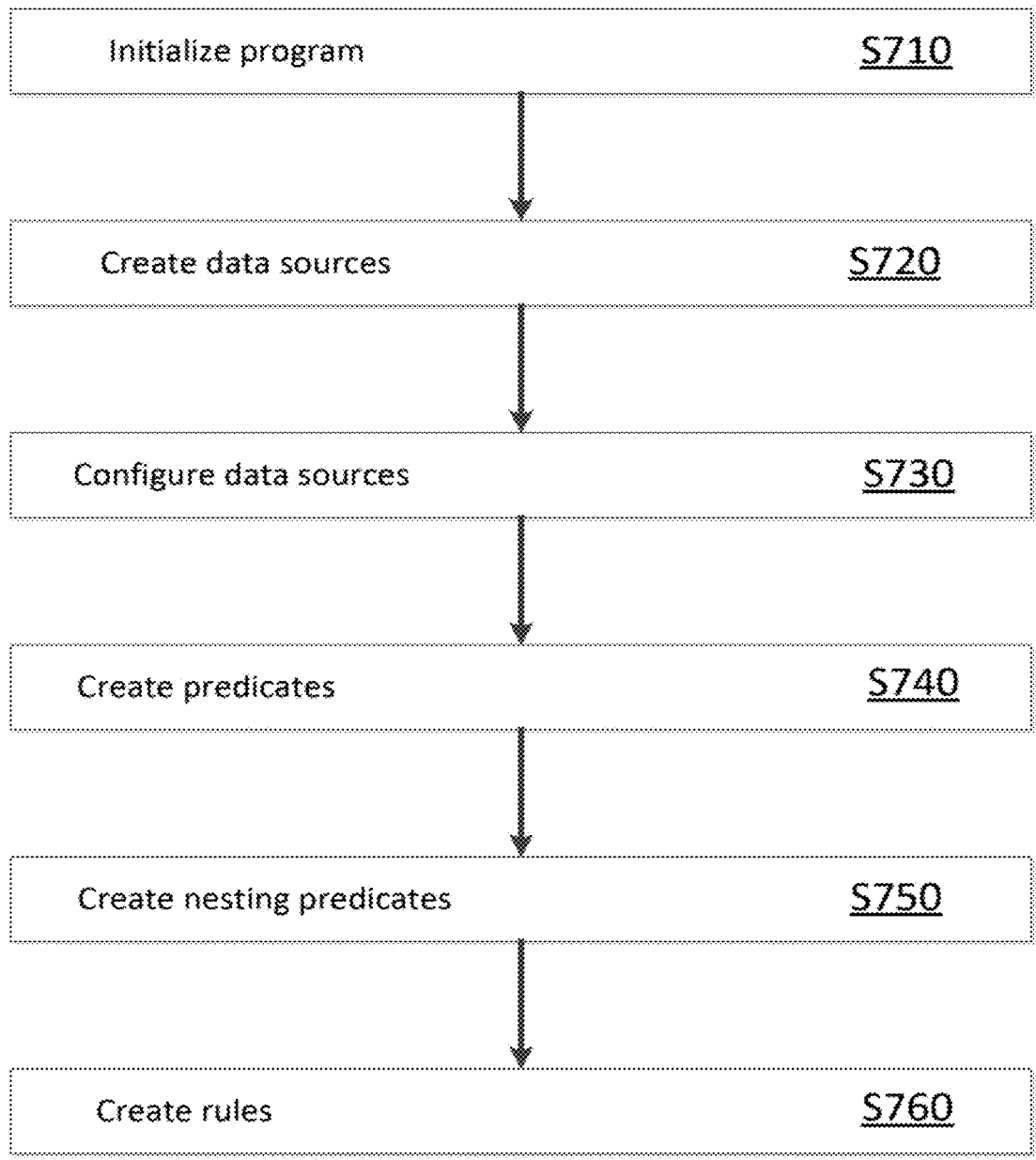
FIG. 7 is a flowchart of exemplary activities within an enterprise services system according to an embodiment.

FIG. 7 is a flowchart of exemplary activities within the enterprise services system 110. In step S710, a program is initialized. The program can be initialized by a user from a user device. An operational console includes, but is not limited to a user manager, a host and data source configuration, and a process configuration, execution, and monitoring console.

In step S720, one or more data sources are created. Data sources include, but are not limited to a social service program wizard, an extensive data source library, a data source wizard, and a business report and dashboard.

In step S730, one or more data sources are configured. Technical configurations include, but are not limited to a built-in predicates library, an eligibility rule and predicate wizard, and a data quality configuration.

In step S740, one or more predicates are created. This can be implemented via the built-in predicates library and/or the predicate wizard.

In step S750, one or more nesting predicates are created. This can also be implemented via the built-in predicates library and/or the predicate wizard.

In step S760, one or more rules are created. Created rules include, but are not limited to business rules, eligibility rules, processing rules, priority rules, and data quality rules.

Figure 8:
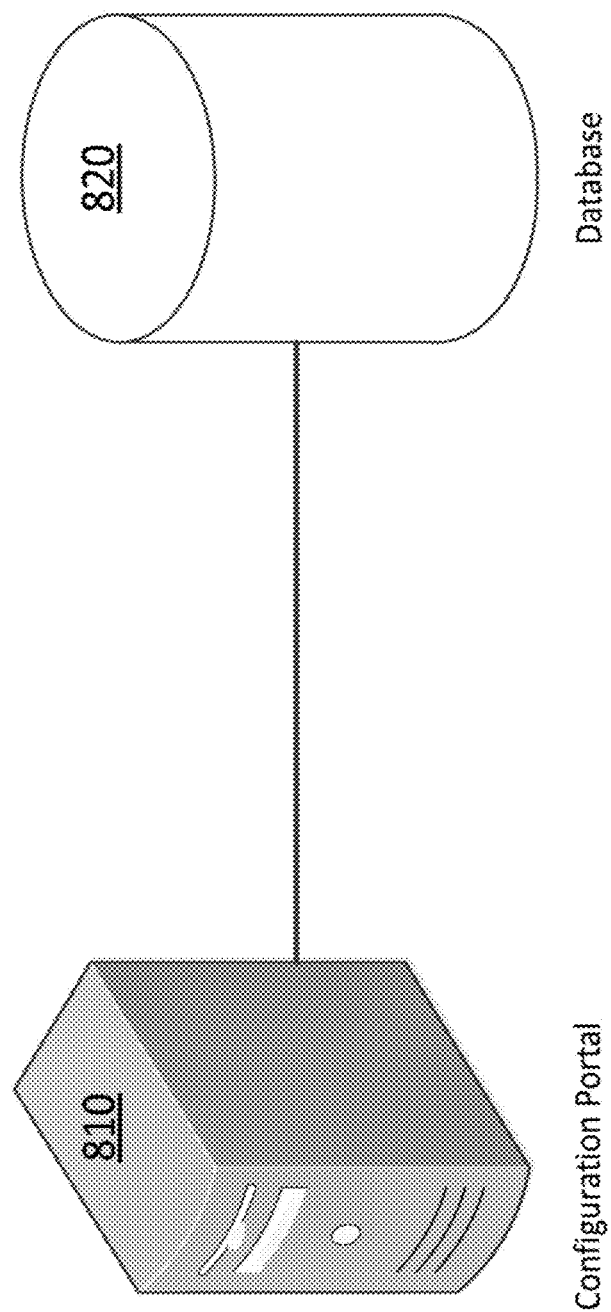
FIG. 8 is a schematic of a configuration portal connected to an associated database according to an embodiment.

FIG. 8 is a schematic of a configuration portal 810 connected to an associated database 820. The configuration portal 810 in association with the database 820 can be used to create and implement one or more of the host and data source configuration, the process configuration, and the data quality configuration.

Figure 9:
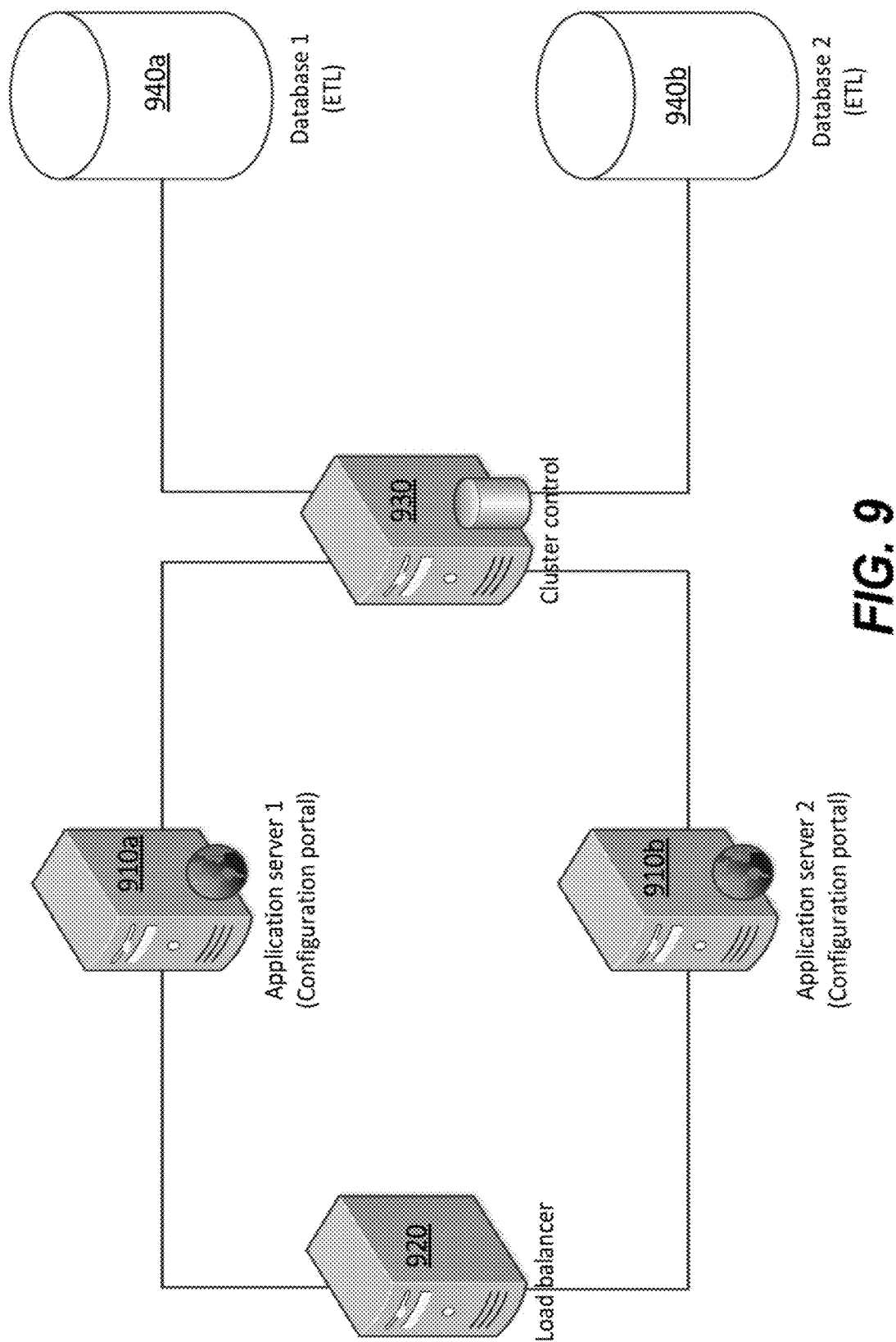
FIG. 9 is a schematic of an exemplary enterprise services system according to an embodiment.

FIG. 9 is a schematic of an exemplary deployment and physical layout of the enterprise services system 110. Multiple application servers 910a and 910b of the configuration portal 810 are connected to a load balancer 920. Only two application servers 910a and 910b are illustrated for simplicity. However, more than two application servers 910 are contemplated by embodiments described herein.

Application servers 910a and 910b are also connected to a cluster control server 930. The cluster control server 930 is connected to multiple ETL databases 940a and 940b. Only two ETL databases 940a and 940b are illustrated for simplicity. However, more than two ETL databases 940 are contemplated by embodiments described herein.

Figure 10:
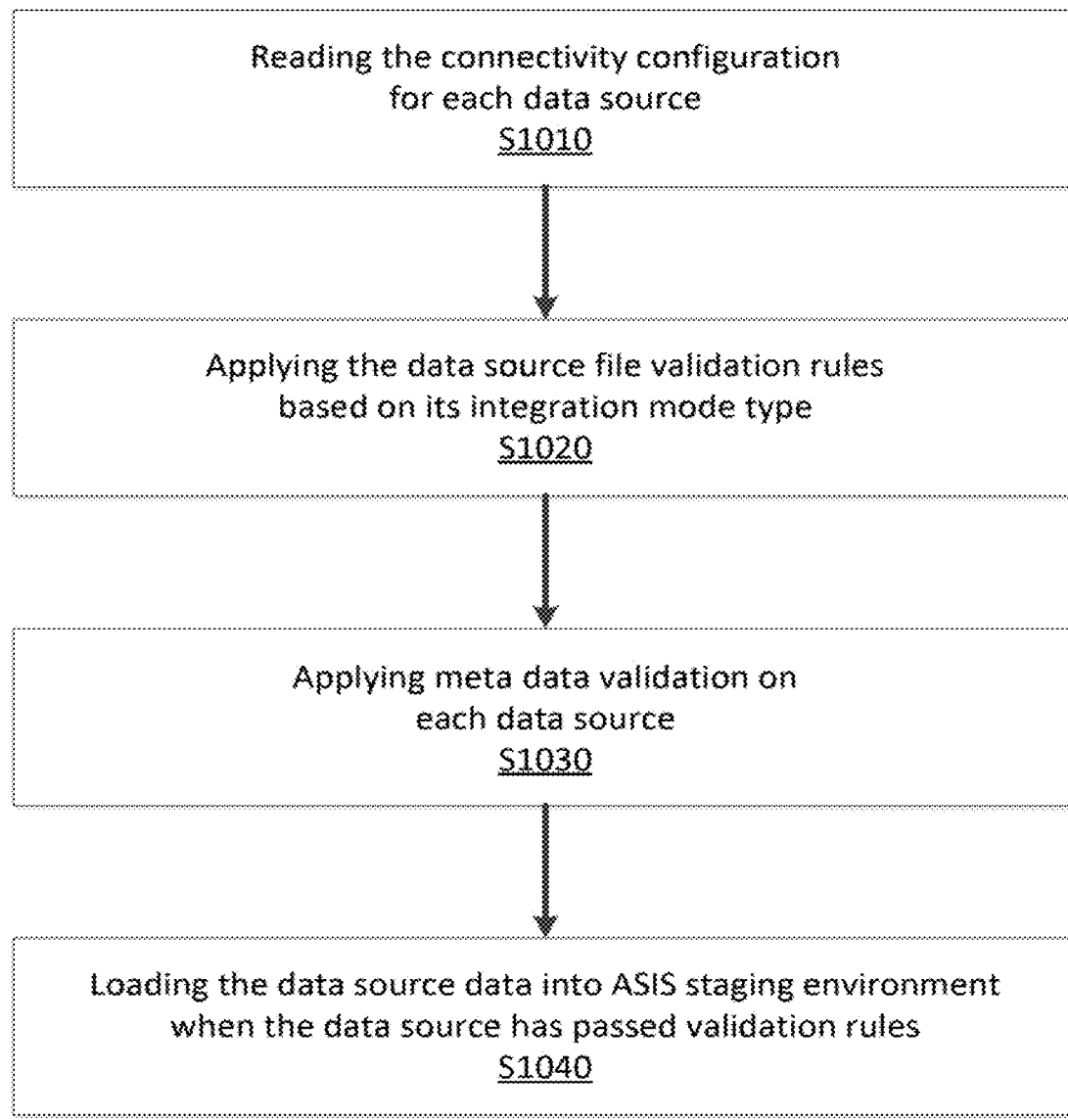
FIG. 10 is a flowchart of exemplary activities within a data integration platform according to an embodiment.

FIG. 10 is a flowchart of exemplary activities within the data integration platform 120. The data integration platform 120 is responsible for integrating the SSP with other data sources. The integration process is available across different channels and integration modes.

In step S1010, the connectivity configuration for each data source is read.

In step S1020, the data source file validation rules based on their integration mode type are applied. The integration mode type can be a batch mode type, an online mode type, or a hybrid mode type.

In step S1030, meta data validation is applied on each data source. Data sources include, but are not limited to government, semi-government, and private sectors; multi-domain support data sources, such as employment, social welfare, and housing support sources; and direct or indirect agency data sources.

In step S1040, the data source data is loaded into an ASIS staging environment when the data source has passed all validation rules for data loads, archive data loads, transformation data loads, consolidation data loads, and the like.

Figure 11:
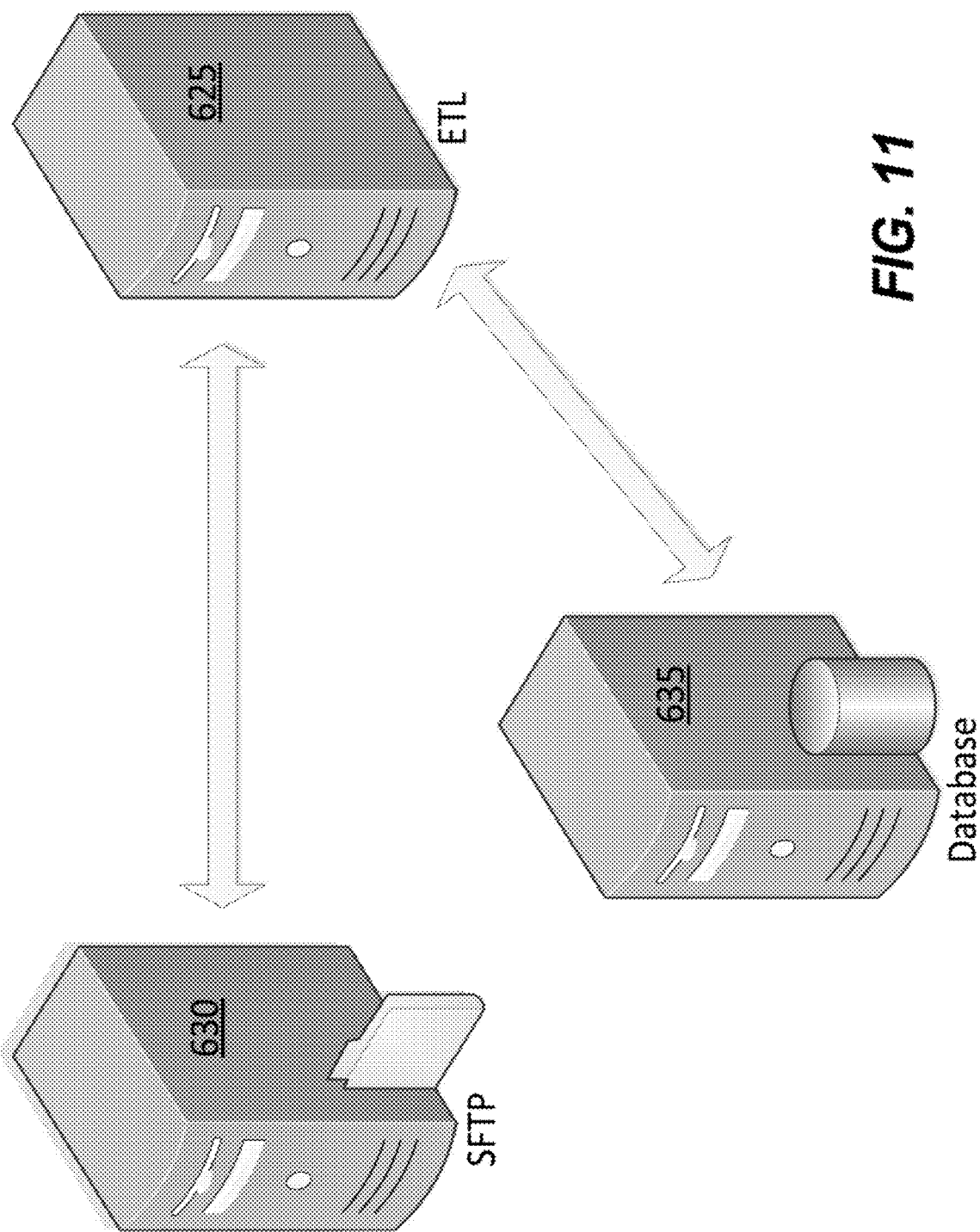
FIG. 11 is a schematic of an exemplary data integration platform according to an embodiment.

FIG. 11 is a schematic of an exemplary data integration platform 120. SSP SFTP host 630 is connected to SSP ETL host 625. SSP ETL host 625 is also connected to SSP ETL database 635.

Figure 12:
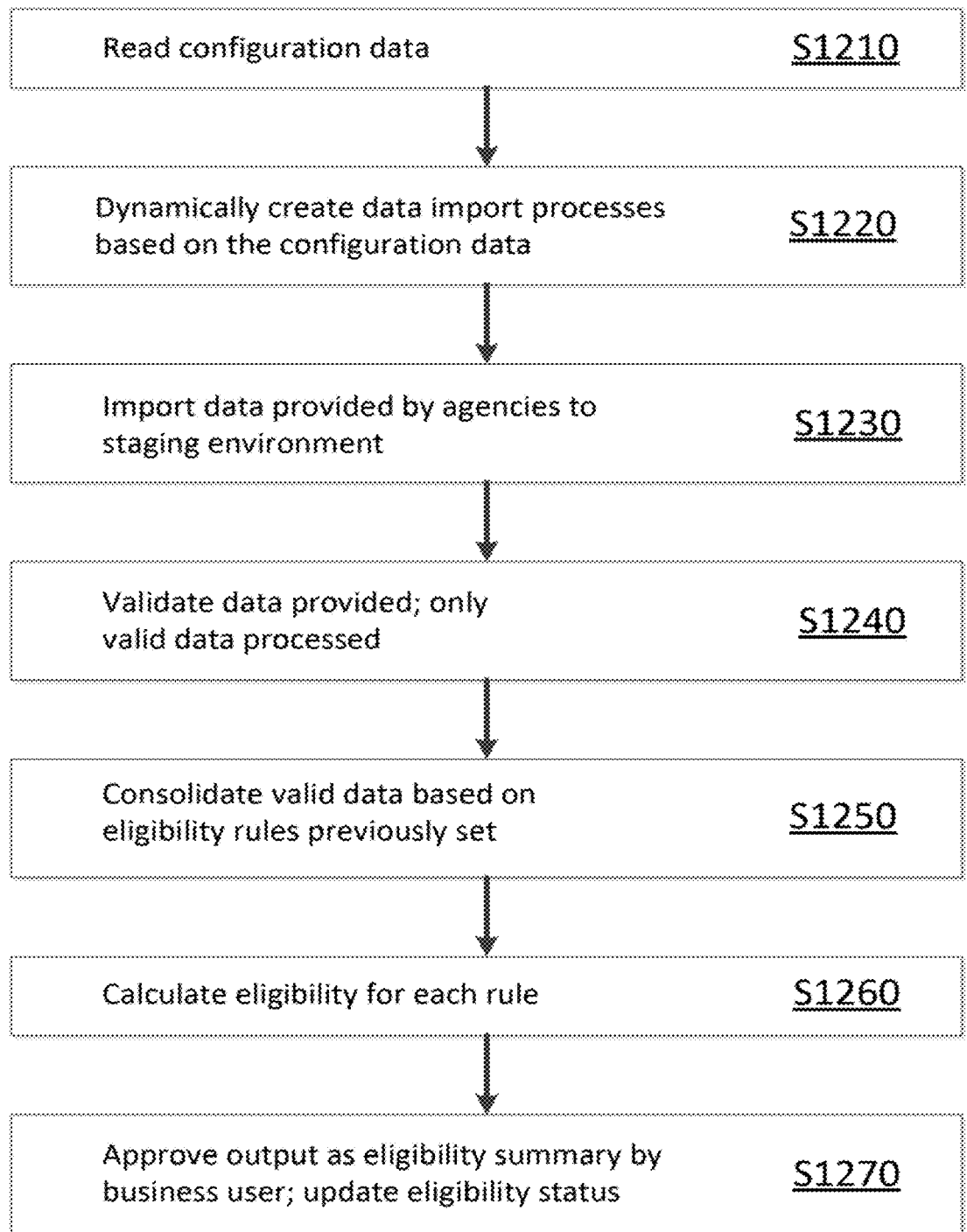
FIG. 12 is a flowchart of exemplary activities within an eligibility engine according to an embodiment.

FIG. 12 is a flowchart of exemplary activities within the eligibility engine 130. The eligibility engine 130 is responsible for processing the data related to the application of candidates and the determination of their eligibility, based on a set of rules and conditions set by the business user.

In step S1210, configuration data is read and completed. Step S1210 can be completed by a user at a user device.

In step S1220, data import processes are dynamically created, based upon the configuration data from step S1210.

In step S1230, data provided by agencies is imported to a database staging environment.

In step S1240, the provided data is validated. Only valid data is processed, while the remaining data is rejected.

In step S1250, the valid data is consolidated, based upon eligibility rules previously established in step S1210.

In step S1260, the eligibility for each rule is calculated.

In step S1270, the results of step S1260 are output to an eligibility summary. The eligibility summary is approved by a business user. When the output is approved, the eligibility status is updated accordingly.

The eligibility engine is automatically deployed from a user interface and all associated components are created dynamically. The deployment is called through a web service to the ETL engine.

Figure 13:
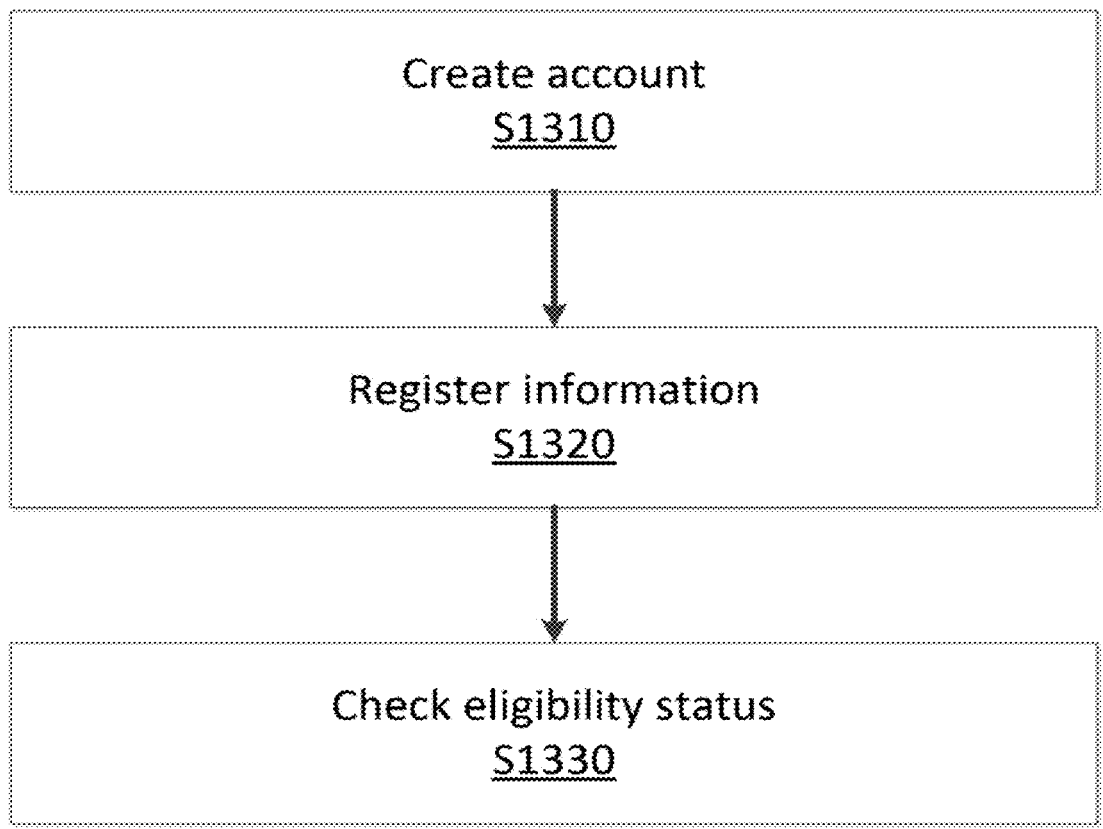
FIG. 13 is a flowchart of exemplary activities within a portal according to an embodiment.

FIG. 13 is a flowchart of exemplary activities within the portal 140. In step S1310, an account is created. In step S1320, information is registered. In step S1330, the eligibility status is checked.

Figure 14:
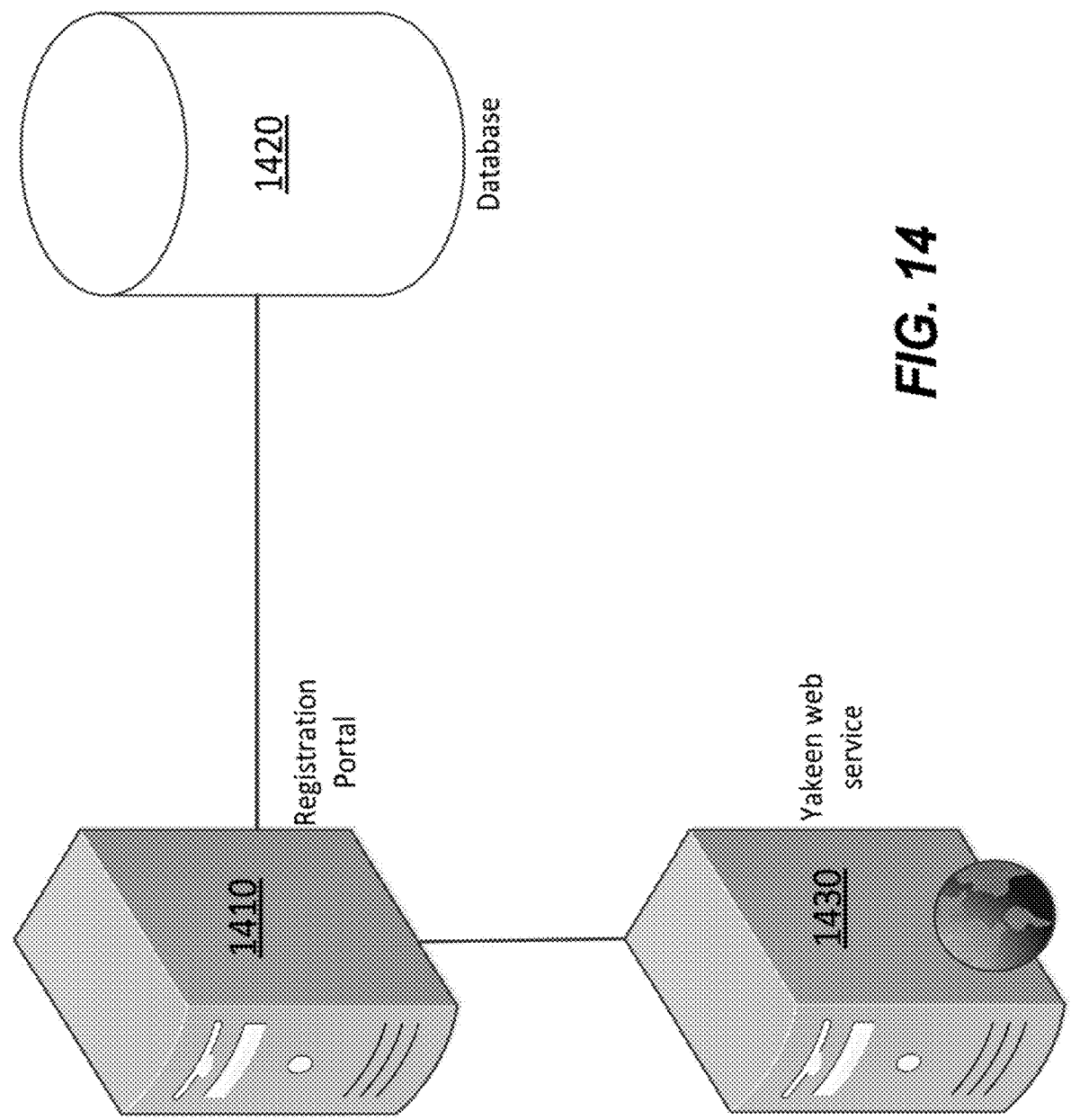
FIG. 14 is a schematic of a registration portal according to an embodiment.

FIG. 14 is a schematic of a registration portal 1410 connected to an associated database 1420. The registration portal 1410 is also connected to a web services server 1430, such as a Yakeen web services server.

Figure 15:
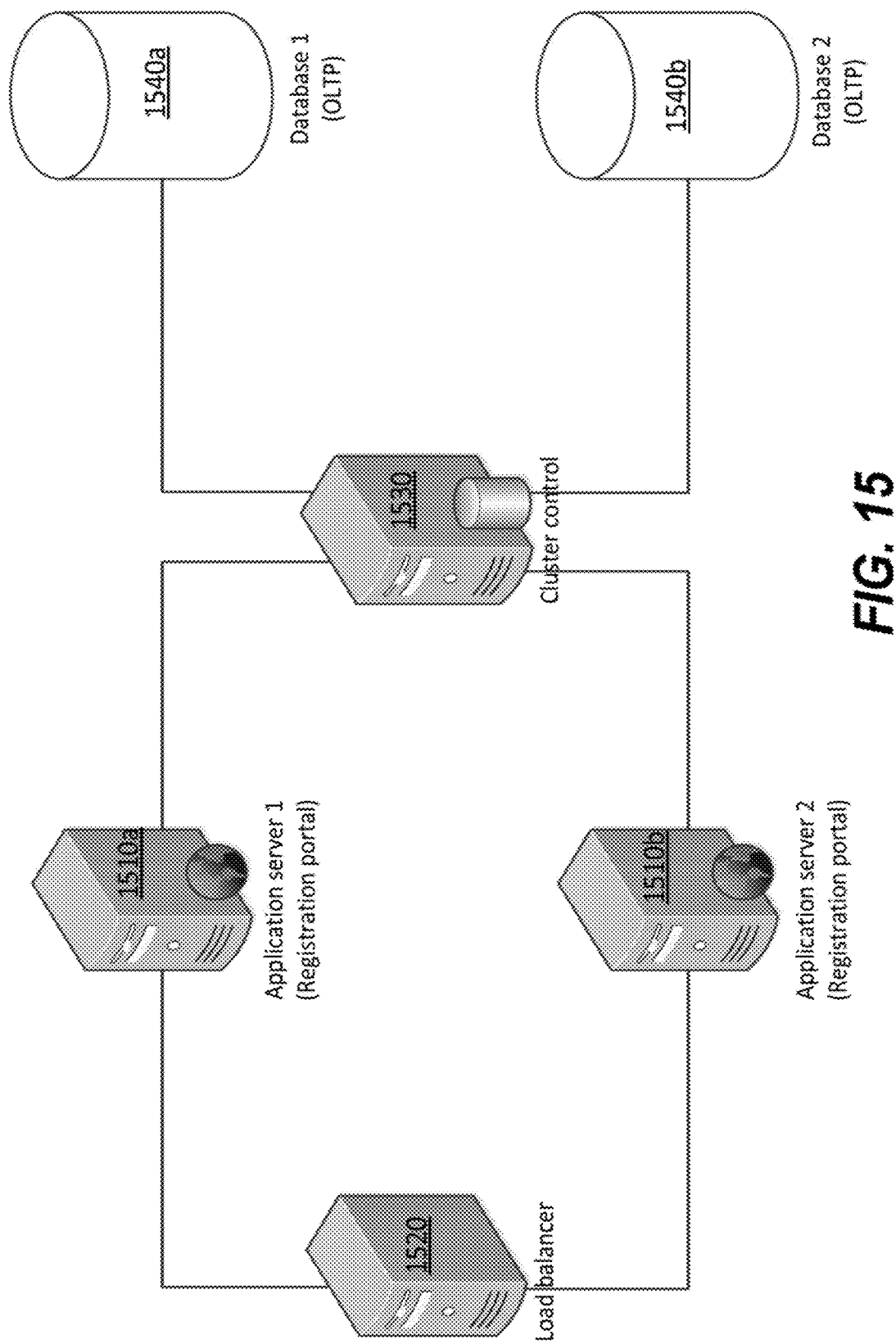
FIG. 15 is a schematic of an exemplary physical layout of a portal according to an embodiment.

FIG. 15 is a schematic of an exemplary deployment and physical layout of the portal 140. Multiple application servers 1510a and 1510b of the registration portal 1410 are connected to a load balancer 1520. Only two application servers 1510a and 1510b are illustrated for simplicity. However, more than two application servers 1510 are contemplated by embodiments described herein.

Application servers 1510a and 1510b are also connected to a cluster control server 1530. The cluster control server 1530 is connected to multiple OLTP databases 1540a and 1540b. Only two databases 1540a and 1540b are illustrated for simplicity. However, more than two OLTP databases 1540 are contemplated by embodiments described herein.

The system architecture 100 for managing and operating social service programs implements a configurable data integration platform to support government agencies, non-government agencies, organizations, and the like, with the facilitation of social service programs. The system architecture 100 for managing and operating social service programs can be utilized across a variety of sectors including housing services, unemployment benefits, health benefits, old-age benefits, family benefits, financial loans, subsidy services, tax exemption, credit rating, and the like. As such, the configurable data integration platform can be utilized by banks, schools, insurance companies, hospitals and other organizations to develop a platform that manages a dynamic array of business rules corresponding to the particular desires of each entity.

The system architecture 100 for managing and operating social service programs can be configured to implement a single information technology platform for performing social services through the access and manipulation of configurable databases. As such, the system architecture 100 for managing and operating social service programs can grant benefits to applicants based on multiple internal/external entities and business processes.

Figure 16:
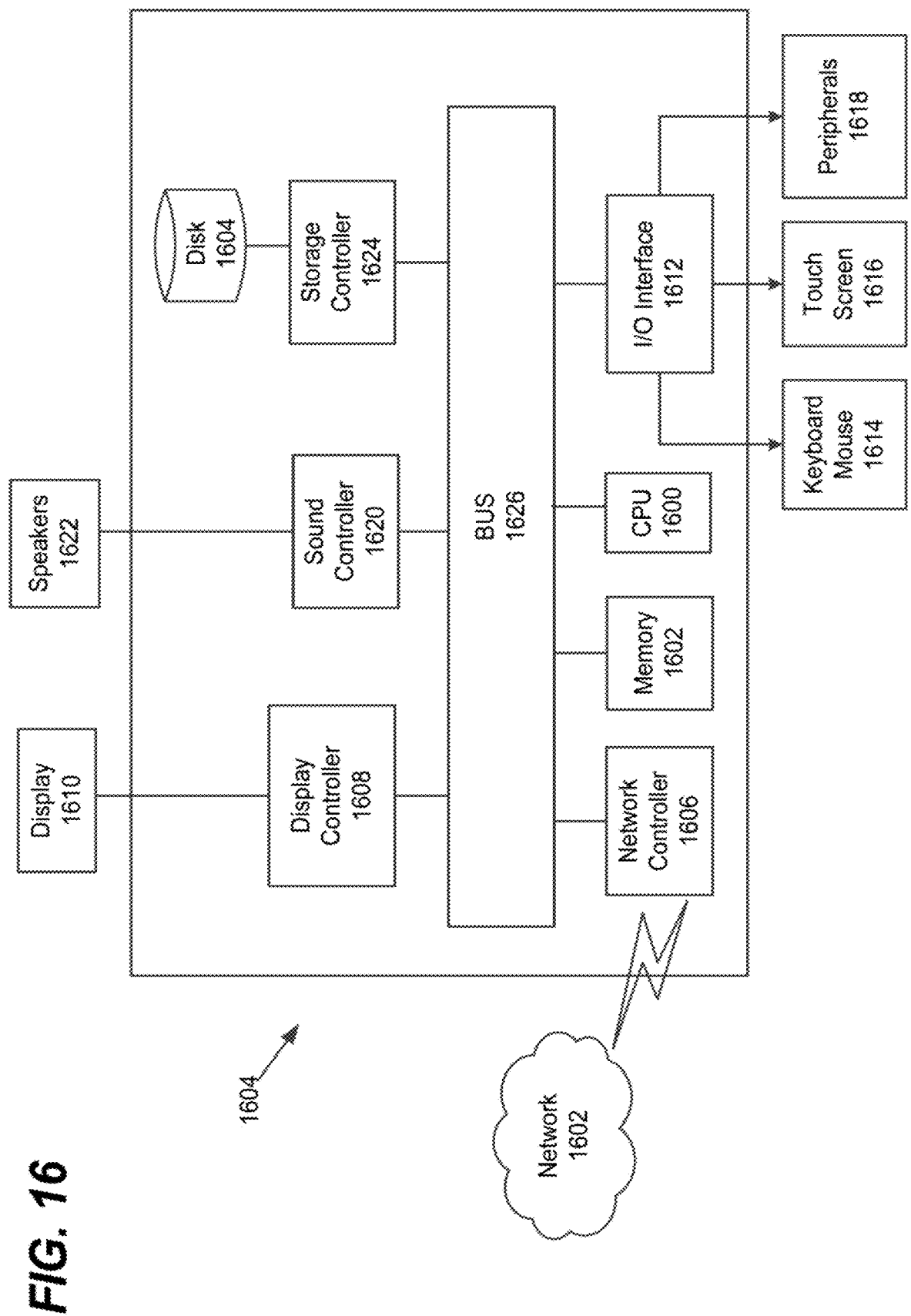
FIG. 16 is a hardware block diagram of a server, according to an embodiment.

FIG. 16 is a hardware block diagram of a server, such as one or more of 605a-605d, 625, 630, 645, 655, 810, 910a-910b, 920, 930, 1410, 1430, 1510a-1510b, 1520, and 1530, according to certain exemplary aspects. In FIG. 16, the server 1604 includes a CPU 1600 which performs the processes described above/below. The process data and instructions may be stored in memory 1602. These processes and instructions may also be stored on a storage medium disk 1604 such as a hard disk drive (HDD) or portable storage medium or may be stored remotely. Further, the process data and instructions are not limited by the form of the computer-readable media on which the instructions of the process are stored. For example, the instructions may be stored on CDs, DVDs, in FLASH memory, RAM, ROM, PROM, EPROM, EEPROM, hard disk or any other information processing device with which the server 1604 communicates, such as a computer or another server.

Further, the process data and instructions may be provided as a utility application, background daemon, or component of an operating system, or combination thereof, executing in conjunction with CPU 1600 and an operating system such as Microsoft Windows 7, UNIX, Solaris, LINUX, Apple MAC-OS and other systems known to those skilled in the art.

The hardware elements used to achieve the server 1604 may be realized by various circuitry elements, known to those skilled in the art. For example, CPU 1600 may be a Xenon or Core processor from Intel of America or an Opteron processor from AMD of America, or may be other processor types that would be recognized by one of ordinary skill in the art. Alternatively, the CPU 1600 may be implemented on an FPGA, ASIC, PLD or using discrete logic circuits, as one of ordinary skill in the art would recognize. Further, CPU 1600 may be implemented as multiple processors cooperatively working in parallel to perform the instructions of the processes described above.

The server 1604 in FIG. 16 also includes a network controller 1606, such as an Intel Ethernet PRO network interface card from Intel Corporation of America, for interfacing with network 1602. As can be appreciated, the network 1602 can be a public network, such as the Internet, or a private network such as an LAN or WAN network, or any combination thereof and can also include PSTN or ISDN sub-networks. The network 1602 can also be wired, such as an Ethernet network, or can be wireless such as a cellular network including EDGE, 3G and 4G wireless cellular systems. The wireless network can also be Wi-Fi, BLUETOOTH, or any other wireless form of communication.

The server 1604 further includes a display controller 1608, such as a NVIDIA GeForce GTX or Quadro graphics adaptor from NVIDIA Corporation of America for interfacing with display 1610, such as a Hewlett Packard HPL2445w LCD monitor. A general purpose I/O interface 1612 interfaces with a touch screen panel 1616 on or separate from display 1610.

A sound controller 1620 is also provided in the server 1604, such as Sound Blaster X-Fi Titanium from Creative, to interface with speakers/microphone 1622 thereby providing sounds and/or music.

The general purpose storage controller 1624 connects the storage medium disk 1604 with communication bus 1626, which may be an ISA, EISA, VESA, PCI, or similar, for interconnecting all of the components of the server 1604. A description of the general features and functionality of the display 1610, as well as the display controller 1608, storage controller 1624, network controller 1606, sound controller 1620, and general purpose I/O interface 1612 is omitted herein for brevity.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 17.

Figure 17:
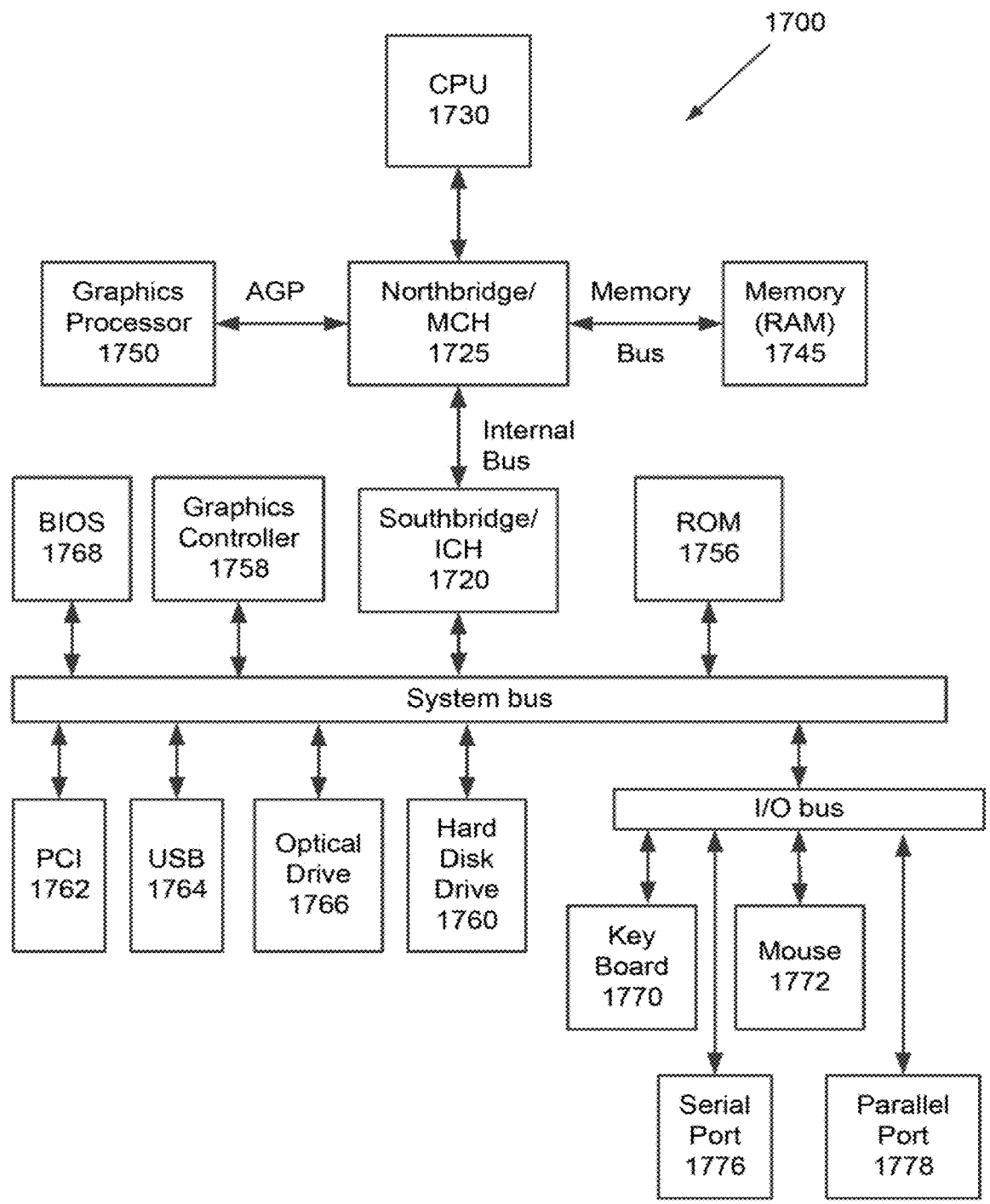
FIG. 17 is a hardware block diagram of a data processing system, according to an embodiment.

FIG. 17 is a hardware block diagram of a data processing system 1700, according to certain exemplary aspects of the present disclosure. The data processing system 1700 is an example of a computer in which code or instructions implementing the processes of the illustrative aspects may be located.

In FIG. 17, the data processing system 1700 employs a hub architecture including a north bridge and memory controller hub (NB/MCH) 1725 and a south bridge and input/output (I/O) controller hub (SB/ICH) 1720. The central processing unit (CPU) 1730 is connected to NB/MCH 1725. The NB/MCH 1725 also connects to the memory 1745 via a memory bus, and connects to the graphics processor 1750 via an accelerated graphics port (AGP). The NB/MCH 1725 also connects to the SB/ICH 1720 via an internal bus (e.g., a unified media interface or a direct media interface). The CPU 1730 may contain one or more processors and may be implemented using one or more heterogeneous processor systems.

Figure 18:
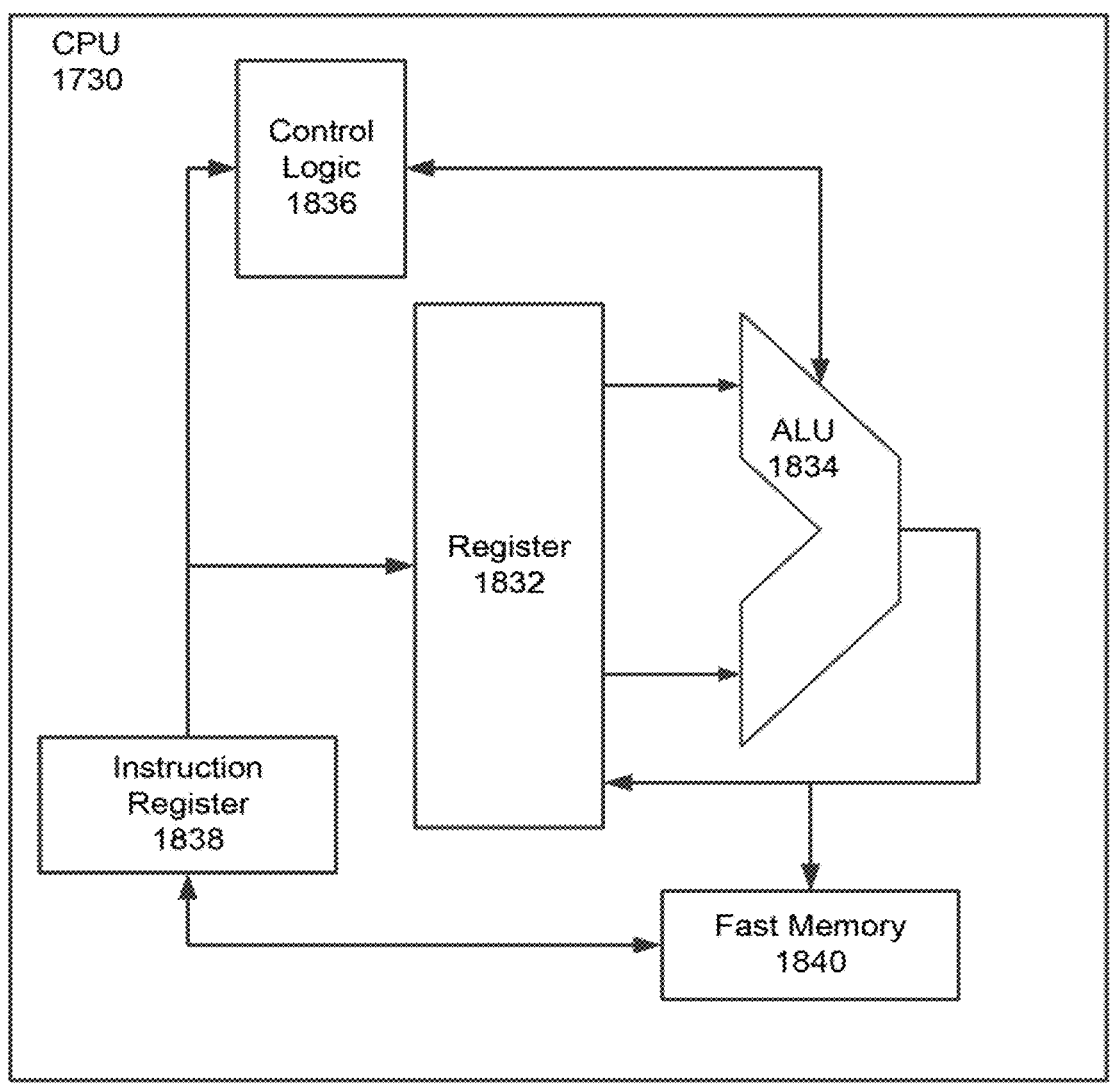
FIG. 18 is a hardware block diagram of a CPU, according to an embodiment.

FIG. 18 is a hardware block diagram of a CPU, according to certain exemplary aspects of the present disclosure. For example, FIG. 18 shows one implementation of CPU 1730. In one implementation, the instruction register 1838 retrieves instructions from the fast memory 1840. At least part of these instructions are fetched from the instruction register 1838 by the control logic 1836 and interpreted according to the instruction set architecture of the CPU 1730. Part of the instructions can also be directed to the register 1832. In one implementation the instructions are decoded according to a hardwired method, and in another implementation the instructions are decoded according to a microprogram that translates instructions into sets of CPU configuration signals that are applied sequentially over multiple clock pulses.

After fetching and decoding the instructions, the instructions are executed using the arithmetic logic unit (ALU) 1834 that loads values from the register 1832 and performs logical and mathematical operations on the loaded values according to the instructions. The results from these operations can be fed back into the register and/or stored in the fast memory 1840. According to certain implementations, the instruction set architecture of the CPU 1730 can use a reduced instruction set architecture, a complex instruction set architecture, a vector processor architecture, or a very large instruction word architecture. Furthermore, the CPU 1730 can be based on the Von Neuman model or the Harvard model. The CPU 1730 can be a digital signal processor, an FPGA, an ASIC, a PLA, a PLD, or a CPLD. Further, the CPU 1730 can be an x86 processor by Intel or by AMID; an ARM processor, a Power architecture processor by, e.g., IBM; a SPARC architecture processor by Sun Microsystems or by Oracle; or other known CPU architecture.

Referring again to FIG. 17, the SB/ICH 1720 can be coupled through a system bus to an I/O Bus, a read only memory (ROM) 1756, universal serial bus (USB) port 1764, a flash binary input/output system (BIOS) 1768, and a graphics controller 1758. PCI/PCIe devices can also be coupled to SB/ICH 1720 through a PCI bus 1762.

The PCI devices may include, for example, Ethernet adapters, add-in cards, and PC cards for notebook computers. The Hard disk drive 1760 and CD-ROM 1756 can use, for example, an integrated drive electronics (IDE) or serial advanced technology attachment (SATA) interface. In one implementation the I/O bus can include a super I/O (SIO) device.

Further, the hard disk drive (HDD) 1760 and optical drive 1766 can also be coupled to the SB/ICH 1720 through a system bus. In one implementation a parallel port 1778 and a serial port 1776 can be connected to the system bus through the I/O bus. Other peripherals and devices can be connected to the SB/ICH 1720 using a mass storage controller such as SATA or PATA, an Ethernet port, an ISA bus, a LPC bridge, SMBus, a DMA controller, and an Audio Codec.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process.

The above-described hardware description is a non-limiting example of corresponding structure for performing the functionality described herein.

A number of implementations have been described. Nevertheless, it will be understood that various modifications may be made without departing from the spirit and scope of this disclosure. For example, other results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The above disclosure also encompasses the aspects listed below.

(1) A device includes circuitry configured to provide a configurable platform including a rules-based processing engine configured to perform bulk and parallel processing of an extract-transform-load (ETL) data load flow, access and manipulate in response to a request from a remote device a plurality of configurable databases, retrieve first data from one of the configurable databases, register the first data for one or more task programs of the configurable platform, and authenticate the first data according to one or more authenticity parameters. The circuitry is also configured to process the first data against processing rules of the rules-based processing engine to generate an assessment of the first data based on the processing rules, and identify and configure each task program when the assessment of the first data satisfies predetermined criteria according to the processing rules. The circuitry is further configured to measure the ETL data load flow against a predetermined performance threshold, route the ETL data load flow to a database processing engine when the rules-based processing engine does not satisfy the predetermined performance threshold, and output to the remote device a data disbursement of results associated with the task program when the first data is authenticated and the predetermined performance threshold has been satisfied by the rules-based processing engine.

(2) The device of (1), wherein the configurable platform supports multi-mode execution with data lineage and data archival features.

(3) The device of either (1) or (2), wherein the bulk and parallel processing includes a hybrid implementation of ETL processing and database engine processing.

(4) The device of any one of (1) to (3), wherein the ETL processing is performed for at least one of Ada Semantic Interface Specification (ASIS) data loads, archive data loads, transformation data loads, and consolidation data loads.

(5) The device of any one of (1) to (4), wherein the database engine processing is performed for at least one of transformation data loads and consolidation data loads.

(6) The device of any one of (1) to (5), wherein the processing rules are applied to the first data in a bulk implementation, thereby generating a low to high level granularity of data corresponding to the processing rules.

(7) The device of any one of (1) to (6), wherein the circuitry is further configured to determine one or more scenarios corresponding to requirements of each processing rule.

(8) The device of any one of (1) to (7), wherein the circuitry is further configured to calculate a scenario assessment of each scenario according to the first data, consolidate the scenario assessments in preparation for the bulk processing, and calculate an eligibility of the first data in bulk mode according to the consolidated scenario assessments.

(9) The device of any one of (1) to (8), wherein the one or more authenticity parameters include at least one of a national identification, a birth date, an issuance date of a national identification, an expiry date of a national identification, a validation of household, a password, a predetermined biometric input, and a predetermined answer to a predetermined security question.

(10) The device of any one of (1) to (9), wherein the configurable platform includes at least one of a built-in data source library, intelligent predicates, and data quality rules.

(11) A method, including: providing, via circuitry, a configurable platform including a rules-based processing engine configured to perform bulk and parallel processing of an extract-transform-load (ETL) data load flow; accessing and manipulating in response to a request from a remote device, a plurality of configurable databases; retrieving first data from one of the configurable databases; registering the first data for one or more task programs of the configurable platform; authenticating the first data according to one or more authenticity parameters; processing the first data against processing rules of the rules-based processing engine to generate an assessment of the first data based on the processing rules; identifying and configuring each task program when the assessment of the first data satisfies predetermined criteria according to the processing rules; measuring ETL data load flow against a predetermined performance threshold; routing the ETL data load flow to a database processing engine when the rules-based processing engine does not satisfy the predetermined performance threshold; and outputting to the remote device, a data disbursement of results associated with the task program when the first data is authenticated and the predetermined performance threshold has been satisfied by the rules-based processing engine.

(12) The method of (11), wherein the configurable platform supports multi-mode execution with data lineage and data archival features.

(13) The method of either (11) or (12), wherein the bulk and parallel processing includes a hybrid implementation of ETL processing and database engine processing.

(14) The method of any one of (11) to (13), wherein the ETL processing is performed for at least one of Ada Semantic Interface Specification (ASIS) data loads, archive data loads, transformation data loads, and consolidation data loads.

(15) The method of any one of (11) to (14), wherein the database engine processing is performed for at least one of transformation data loads and consolidation data loads.

(16) The method of any one of (11) to (15), wherein the processing rules are applied to the first data in a bulk manner, thereby generating a low to high level granularity of data corresponding to the processing rules.

(17) The method of any one of (11) to (16), further including: determining one or more scenarios corresponding to requirements of each processing rule.

(18) The method of any one of (11) to (17), further including: calculating a scenario assessment of each scenario according to the first data, consolidating the scenario assessments in preparation for the bulk processing, and calculating an eligibility of the first data in bulk mode according to the consolidated scenario assessments.

(19) The method of any one of (11) to (18), wherein the configurable platform includes at least one of a built-in data source library, intelligent predicates, and data quality rules.

(20) A non-transitory computer-readable storage medium having computer-executable instructions embodied thereon, that when executed by a computing device, performs a method. The method includes providing a configurable platform including a rules-based processing engine configured to perform bulk and parallel processing of an extract-transform-load (ETL) data load flow; accessing and manipulating, in response to a request from a remote device, a plurality of configurable databases; retrieving first data from one of the configurable databases; registering the first data for one or more task programs of the configurable platform; authenticating the first data according to one or more authenticity parameters; processing the first data against processing rules of the rules-based processing engine to generate an assessment of the first data based on the processing rules; identifying and configuring each task program when the assessment of the first data satisfies predetermined criteria according to the processing rules; measuring the ETL data load flow against a predetermined performance threshold; routing the ETL data load flow to a database processing engine when the rules-based processing engine does not satisfy the predetermined performance threshold; and outputting to the remote device, a data disbursement of results associated with the task program when the first data is authenticated and the predetermined performance threshold has been satisfied by the rules-based processing engine.

The invention claimed is:

1. A multi-dynamic data retrieval and data disbursement method comprising:
   providing, with circuitry, a configurable platform including an eligibility engine,
      wherein the eligibility engine including a rules-based processing engine configured to perform bulk and parallel processing of an extract-transform-load (ETL) data load flow, a workflow engine, and a prioritization engine, and
      wherein the eligibility engine being connected to internal and external data sources via the configurable platform;
   accessing and manipulating, with the circuitry, in response to a request from a remote device, a plurality of configurable databases,
      wherein the plurality of configurable databases including a core database comprising ETL data, a portal database comprising profile data and an archive database comprising platform data;
   retrieving, with the circuitry using a data import process based on configuration data, first data from one of the configurable databases;
   registering, with the circuitry, the first data for one or more task programs of the configurable platform;
   authenticating, with the circuitry, the first data according to one or more authenticity parameters;
   processing, with the circuitry, the first data against processing rules of the rules-based processing engine to generate an assessment of the first data based on the processing rules;
   identifying and configuring, with the circuitry, each task program when the assessment of the first data satisfies predetermined criteria according to the processing rules;
   measuring, with the circuitry, ETL data load flow against a predetermined performance threshold;
   routing, with the circuitry, the ETL data load flow to a database processing engine when the rules-based processing engine does not satisfy the predetermined performance threshold;
   generating a plurality of granularity levels of data via ETL processing corresponding to the processing rules when the rules-based processing engine satisfies the predetermined performance threshold;
   characterizing the data based on one or more scenarios;
   determining an eligibility based on the assessment and the one or more scenarios; and
   outputting, with the circuitry, to the remote device, a data disbursement of results associated with the task program when the first data is authenticated and the predetermined performance threshold has been satisfied by the rules-based processing engine.

2. The method according to claim 1, wherein the configurable platform supports multi-mode execution with data lineage and data archival features.

3. The method according to claim 1, wherein the bulk and parallel processing includes a hybrid implementation of ETL processing and database engine processing.

4. The method according to claim 1, wherein the ETL processing is performed for at least one of Ada Semantic Interface Specification (ASIS) data loads, archive data loads, transformation data loads, and consolidation data loads.

5. The method according to claim 1, wherein the database engine processing is performed for at least one of transformation data loads and consolidation data loads.

6. The method according to claim 1, wherein the processing rules are applied to the first data in a bulk manner.

7. The method according to claim 1, further including: determining one or more scenarios corresponding to requirements of each processing rule.

8. The method according to claim 1, wherein the configurable platform includes at least one of a built-in data source library, intelligent predicates, and data quality rules.

* * * * *